United States Patent
Kusashima et al.

(10) Patent No.: US 12,526,847 B2
(45) Date of Patent: Jan. 13, 2026

(54) TERMINAL DEVICE, BASE STATION DEVICE, METHOD, AND RECORDING MEDIUM

(71) Applicant: Sony Group Corporation, Tokyo (JP)

(72) Inventors: Naoki Kusashima, Kanagawa (JP); Kazuyuki Shimezawa, Kanagawa (JP); Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 382 days.

(21) Appl. No.: 18/165,340

(22) Filed: Feb. 7, 2023

(65) Prior Publication Data

US 2023/0180305 A1  Jun. 8, 2023

Related U.S. Application Data

(63) Continuation of application No. 16/649,197, filed as application No. PCT/JP2018/024586 on Jun. 28, 2018, now abandoned.

(30) Foreign Application Priority Data

Sep. 28, 2017  (JP) .................................. 2017-189126

(51) Int. Cl.
*H04W 74/0833* (2024.01)
*H04W 74/0836* (2024.01)
*H04W 74/0838* (2024.01)

(52) U.S. Cl.
CPC ... *H04W 74/0833* (2013.01); *H04W 74/0836* (2024.01); *H04W 74/0838* (2024.01)

(58) Field of Classification Search
CPC ......... H04W 74/0833; H04W 74/0838; H04W 74/0836
See application file for complete search history.

(56) References Cited

U.S. PATENT DOCUMENTS

| | | | |
|---|---|---|---|
| 9,008,050 B2 * | 4/2015 | Feuersanger ....... | H04W 74/006 370/336 |
| 2010/0041370 A1 * | 2/2010 | Narasimha .......... | H04W 74/002 455/410 |
| 2015/0057011 A1 * | 2/2015 | Di Girolamo .... | H04W 72/0446 455/454 |

(Continued)

FOREIGN PATENT DOCUMENTS

| | | |
|---|---|---|
| CN | 106105366 A | 11/2016 |
| EP | 3200514 A1 | 8/2017 |
| JP | 2016-066944 A | 4/2016 |

OTHER PUBLICATIONS

InterDigital "2-step Random Access Procedure in NR", Jan. 17-19, 2017 (Year: 2017).*

(Continued)

*Primary Examiner* — Chuong M Nguyen
(74) *Attorney, Agent, or Firm* — XSENSUS, LLP

(57) ABSTRACT

A method and corresponding terminal device including a selector that selects, in a RACH procedure, whether to transmit a first uplink message or a second uplink message to a base station device, the first uplink message being an uplink message of a two-step RACH procedure, the second uplink message being an uplink message of a four-step RACH procedure.

12 Claims, 16 Drawing Sheets

DUAL CONNECTIVITY

CARRIER AGGREGATION

PRIMARY CELL   PRIMARY SECONDARY CELL   SECONDARY CELL

→ FREQUENCY

(56) References Cited

U.S. PATENT DOCUMENTS

| | | | | |
|---|---|---|---|---|
| 2015/0181546 A1* | 6/2015 | Freda | ................ | H04W 56/0015 |
| | | | | 370/336 |
| 2018/0027594 A1* | 1/2018 | Nagaraja | .............. | H04B 7/0811 |
| | | | | 370/329 |
| 2018/0054837 A1* | 2/2018 | Islam | .................. | H04W 74/006 |
| 2018/0097591 A1* | 4/2018 | Islam | ................ | H04W 72/0446 |
| 2018/0109976 A1* | 4/2018 | Ly | .............................. | H04L 1/00 |
| 2018/0110074 A1* | 4/2018 | Akkarakaran | ........ | H04W 72/21 |
| 2018/0294867 A1* | 10/2018 | Schwab | ............. | H04B 7/15557 |
| 2019/0174554 A1* | 6/2019 | Deenoo | ................ | H04B 7/0617 |
| 2020/0037345 A1* | 1/2020 | Ryoo | ................. | H04W 74/0833 |
| 2020/0100297 A1* | 3/2020 | Agiwal | ............... | H04W 52/365 |

OTHER PUBLICATIONS

International Search Report and Written Opinion mailed on Sep. 11, 2018 for PCT/JP2018/024586 filed on Jun. 28, 2018, 10 pages including English Translation of the International Search Report.

Mediatek Inc., "Random Access Procedure for NB-IoT," 3GPP TSG-RAN2 #91 Bis Meeting, R2-154462, Malmo, Sweden, Oct. 5-9, 2015, 6 pages.

Qualcomm Incorporated, "DL based mobility UL channels," 3GPP TSG-RAN WG1 #86b, R1-1610169, Lisbon, Portugal, Sep. 10-14, 2016, 3 pages.

Sony, "Discussions on 2 Steps RACH Procedure," 3GPP TSG RAN WG1 Meeting AH_NR Meeting, R1-1700668, Spokane, USA, Jan. 16-20, 2017, 5 pages.

ZTE Corporation and ZTE Microelectronics, "On 2-step Random access procedure," 3GPP TSG RAN WG1 Meeting #86b, R1-1608969, Lisbon, Portugal, Oct. 10-14, 2016, 3 pages.

3GPP TSG RAN WG1 AH_NR Meeting, Spokane, USA, Jan. 16-20, 2017, InterDigital Communications, "2-step random access procedure", R1-1700703, 4 pp.

3GPP TSG-RAN WG2 NR Ad Hoc, Spokane, USA, Jan. 17-19, 2017, InterDigital Communications, 2-Step Random Access Procedure in NR, R2-1700237 (Update to R2-168465), 3 pp.

CATT, "Consideration on 2-step RA", 3GPP TSG RAN WG2 Meeting Ad Hoc, R2-1700205, Jan. 17-19, 2017, pp. 1-6.

Intel Corporation, "2-step random access procedure in NR", 3GPP TSG-RAN WG2 #96, R2-168520, Nov. 14-18, 2016, pp. 1-4.

Interdigital Communications, "2-Step Random Access Procedure in NR", 3GPP TSG-RAN WG2 NR Ad Hoc, R2-1700237 (Update to R2-168465), Jan. 17-19, 2017, pp. 1-3.

Interdigital Communications, "2-step random access procedure", 3GPP TSG RAN WG1 AH_NR Meeting, R1-1700703, Jan. 16-20, 2017, pp. 1-4.

"Consideration on the two-step RACH in NR", R2-1700155, 3GPP TSGRAN WG2 NR Ad Hoc Jan. 7, 2017, ZTE, Sections 2-3.

ASUSTek NPL "Consideration on fallbackof2-step RACH procedure", 3GPP R2-1700358, Jan. 17-19, 2017 (Year: 2017).

\* cited by examiner

TERMINAL DEVICE, BASE STATION DEVICE, METHOD, AND RECORDING MEDIUM

CROSS-REFERENCE TO RELATED APPLICATIONS

The present application is a Continuation of U.S. application Ser. No. 16/649,197, filed Mar. 20, 2020, which is based on PCT filing PCT/JP2018/024586, filed Jun. 28, 2018, which claims priority to JP 2017-189126, filed Sep. 28, 2017, the entire contents of each of are incorporated herein by reference.

TECHNICAL FIELD

The present disclosure relates to a terminal device, a base station device, a method, and a recording medium.

BACKGROUND ART

The third-generation partnership project (3rd Generation Partnership Project: 3GPP) studies radio access schemes and radio networks for cellular mobile communications (hereinafter also referred to as "Long Term Evolution (LTE)", "LTE-Advanced (LTE-A)", "LTE-Advanced Pro (LTE-A Pro)", "New Radio (NR)", "New Radio Access Technology (NRAT)", 5G, "Evolved Universal Terrestrial Radio Access (EUTRA)", or "Further EUTRA (FEUTRA)"). In the following explanation, LTE includes LTE-A, LTE-A Pro, and EUTRA, and NR includes NRAT, and FEUTRA. In LTE, a base station device (base station) is also referred to as eNodeB (evolved NodeB). In NR, a base station device (base station) is also referred to as gnodeB (gNB). In LTE and NR, a terminal device (a mobile station, a mobile station device, or a terminal) is also referred to as UE (User Equipment). LTE and NR are cellular communication systems in which a plurality of areas covered by a base station device are arranged in a cell shape. A single base station device may manage multiple cells.

NR is a different RAT (Radio Access Technology) from LTE as a wireless access scheme of the next generation of LTE. NR is an access technology that is able to handle various use cases including eMBB (Enhanced Mobile broadband), mMTC (Massive Machine Type Communications), and URLLC (Ultra reliable and low latency communications). NR is reviewed for the purpose of a technology framework corresponding to use scenarios, request conditions, placement scenarios, and the like in such use cases.

In NR, a random access procedure (RACH procedure) is applied to uses such as initial connection of a cell and uplink synchronization adjustment. The normal RACH procedure includes four exchanges starting from the terminal device. The normal RACH procedure is also referred to as four-step RACH procedure. However, latency is a problem in the four-step RACH procedure. The RACH procedure may be unsuccessful due to factors such as contention of messages and changes in channel conditions, making it difficult to complete the RACH procedure. To solve the issue, a two-step RACH procedure of completing the RACH procedure by only two exchanges has been considered. The detail of the two-step RACH procedure is disclosed in Non-Patent Literature 1.

CITATION LIST

Non-Patent Literature

NPTL 1: Sony, "Discussions on 2 Steps RACH Procedure," R1-1700668, 3GPP TSG RAN WG1 Meeting AH NR meeting, Spokane, USA, January, 2017

SUMMARY OF THE INVENTION

Problems to be Solved by the Invention

Since the two-step RACH procedure completes the procedure with fewer steps, latency is reduced, but stability may be reduced.

Therefore, the present disclosure proposes a mechanism that makes it possible to achieve the stability of the RACH procedure and the reduction in latency of the RACH procedure at the same time.

Means for Solving the Problems

According to an embodiment of the present disclosure, there is provided a terminal device including a selector that selects, in a RACH procedure, whether to transmit a first uplink message or a second uplink message to a base station device, the first uplink message being an uplink message of a two-step RACH procedure, the second uplink message being an uplink message of a four-step RACH procedure.

Further, according to an embodiment of the present disclosure, there is provided a base station device including a setting section that sets, in a terminal device, a first selection reference for the terminal device to select whether to transmit a first uplink message or a second uplink message in a RACH procedure, the first uplink message being an uplink message of a two-step RACH procedure, the second uplink message being an uplink message of a four-step RACH procedure.

Further, according to an embodiment of the present disclosure, there is provided a method executed by a processor, the method including selecting, in a RACH procedure, whether to transmit a first uplink message or a second uplink message to a base station device, the first uplink message being an uplink message of a two-step RACH procedure, the second uplink message being an uplink message of a four-step RACH procedure.

Further, according to an embodiment of the present disclosure, there is provided a method executed by a processor, the method including setting, in a terminal device, a first selection reference for the terminal device to select whether to transmit a first uplink message or a second uplink message in a RACH procedure, the first uplink message being an uplink message of a two-step RACH procedure, the second uplink message being an uplink message of a four-step RACH procedure.

Further, according to an embodiment of the present disclosure, there is provided a recording medium having a program recorded thereon, the program causing a computer to function as a selector that selects, in a RACH procedure, whether to transmit a first uplink message or a second uplink message to a base station device, the first uplink message being an uplink message of a two-step RACH procedure, the second uplink message being an uplink message of a four-step RACH procedure.

Further, according to an embodiment of the present disclosure, there is provided a recording medium having a program recorded thereon, the program causing a computer to function as a setting section that sets, in a terminal device, a first selection reference for the terminal device to select whether to transmit a first uplink message or a second uplink message in a RACH procedure, the first uplink message being an uplink message of a two-step RACH procedure, the second uplink message being an uplink message of a four-step RACH procedure.

Effects of the Invention

As described above, according to an embodiment of the present disclosure, there is provided a mechanism that makes it possible to achieve a stability of the RACH procedure and a reduction in latency of the RACH procedure at the same time. Note that the effects described above are not necessarily limitative. With or in the place of the above effects, there may be achieved any one of the effects described in this specification or other effects that may be grasped from this specification.

MODES FOR CARRYING OUT THE INVENTION

Figure 1:
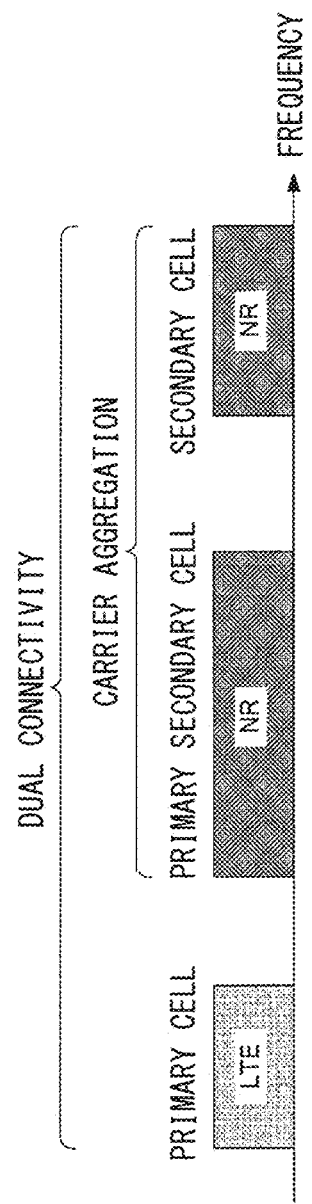
FIG. 1 is a diagram illustrating an example of setting of a component carrier according to an embodiment of the present disclosure.

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted. Further, technologies, functions, methods, configurations, and procedures to be described below and all other descriptions can be applied to LTE and NR unless particularly stated otherwise.

In the following description, "NR-" may be added to the head of a term when the term unique to NR is specifically referred to. For example, PRACH (Physical Random Access Channel) unique to NR may be denoted as NR-PRACH. In contrast, a term without "NR-" at the head may be regarded as a term unique to NR, or may be regarded as a term not unique to NR (for example, a term of LTE). For example, "PRACH" may be viewed as a NR-PRACH or as a PRACH of LTE.

Note that the description is given in the following order.
1. Introduction
2. Technical Issues
3. Technical Features
4. Application Examples
5. Conclusion

1. INTRODUCTION

[Radio Communication System in Present Embodiment]

In the present embodiment, a radio communication system includes at least a base station device 100 and a terminal device 200. The base station device 100 may contain a plurality of terminal devices. The base station device 100 may be coupled to another base station device by means of an X2 interface. The base station device 100 may be coupled to EPC (Evolved Packet Core) by means of an S1 interface. Moreover, the base station device 100 may be coupled to MME (Mobility Management Entity) by means of an S1-MME interface and to S-GW (Serving Gateway) by means of an S1-U interface. The S1 interface supports many-to-many connections between MME and/or S-GW and the base station device 100. In the present embodiment, the base station device 100 and the terminal device 200 each support LTE and/or NR.

[Radio Access Technology According to Present Embodiment]

In the present embodiment, the base station device 100 and the terminal device 200 each support one or more radio access technologies (RATs). For example, RAT includes LTE and NR. One RAT corresponds to one cell (component carrier). That is, in a case where multiple RATs are supported, the RATs correspond to different cells. In the present embodiment, a cell is a combination of a downlink resource, an uplink resource, and/or a sidelink. In the following description, a cell corresponding to LTE is referred to as an LTE cell, and a cell corresponding to NR is referred to as an NR cell.

Downlink communication is communication from the base station device 100 to the terminal device 200. Downlink transmission is transmission from the base station device 100 to the terminal device 200 and is transmission of a downlink physical channel and/or a downlink physical signal. Uplink communication is communication from the terminal device 200 to the base station device 100. Uplink transmission is transmission from the terminal device 200 to the base station device 100 and is transmission of an uplink physical channel and/or an uplink physical signal. Sidelink communication is communication from the terminal device 200 to another terminal device 200. Sidelink transmission is transmission from the terminal device 200 to another terminal device 200 and is transmission of a sidelink physical channel and/or a sidelink physical signal.

The sidelink communication is defined for contiguous direct detection and contiguous direct communication between terminal devices 200. The sidelink communication can use a frame configuration similar to that of the uplink and downlink. Further, the sidelink communication can be restricted to some (sub sets) of uplink resources and/or downlink resources.

The base station device 100 and the terminal device 200 are able to support communication in which a set of one or more cells is used in a downlink, an uplink, and/or a sidelink. A set of a plurality of cells or communication via the set of the plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not necessarily support some functions such as a function of performing standalone communication since connection can be assisted by an LTE cell which is a primary cell. The function of performing standalone communication includes a function necessary for initial connection.

Figure 2:
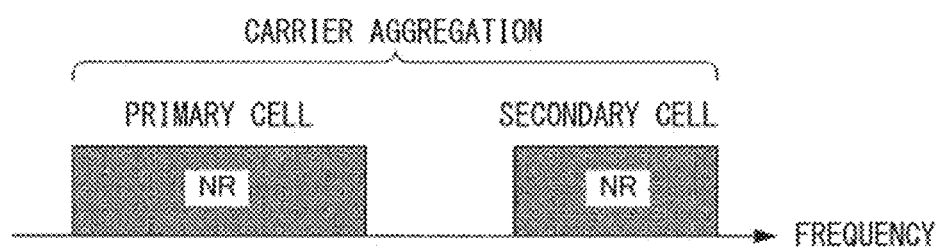
FIG. 2 is a diagram illustrating an example of setting of a component carrier according to the embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assistance by the LTE cell is not necessary. Note that the two NR cells may be integrated by dual connectivity.

[Radio Frame Configuration According to Present Embodiment]

In the present embodiment, a radio frame configured with 10 ms (milliseconds) is specified. Each radio frame includes two half frames. A time interval of the half frame is 5 ms. Each half frame includes 5 subframes. The time interval of the subframe is 1 ms and is defined by two successive slots. The time interval of the slot is 0.5 ms. An i-th subframe in the radio frame includes a (2×i)-th slot and a (2×i+1)-th slot. In other words, 10 subframes are specified in each of the radio frames.

[Frame Configuration of NR According to Present Embodiment]

In each NR cell, one or more predetermined parameters are used in a certain predetermined time length (for example, a subframe). That is, in the NR cell, a downlink signal and an uplink signal are each generated using one or more predetermined parameters in a predetermined time length. In other words, in the terminal device 200, it is assumed that a downlink signal to be transmitted from the base station device 100 and an uplink signal to be transmitted to the base station device 100 are each generated with one or more predetermined parameters in a predetermined time length. Further, the base station device 100 is set such that a downlink signal to be transmitted to the terminal device 200 and an uplink signal to be transmitted from the terminal device 200 are each generated with a predetermined time length using one or more predetermined parameters. In a case where the plurality of predetermined parameters is used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

Figure 3:
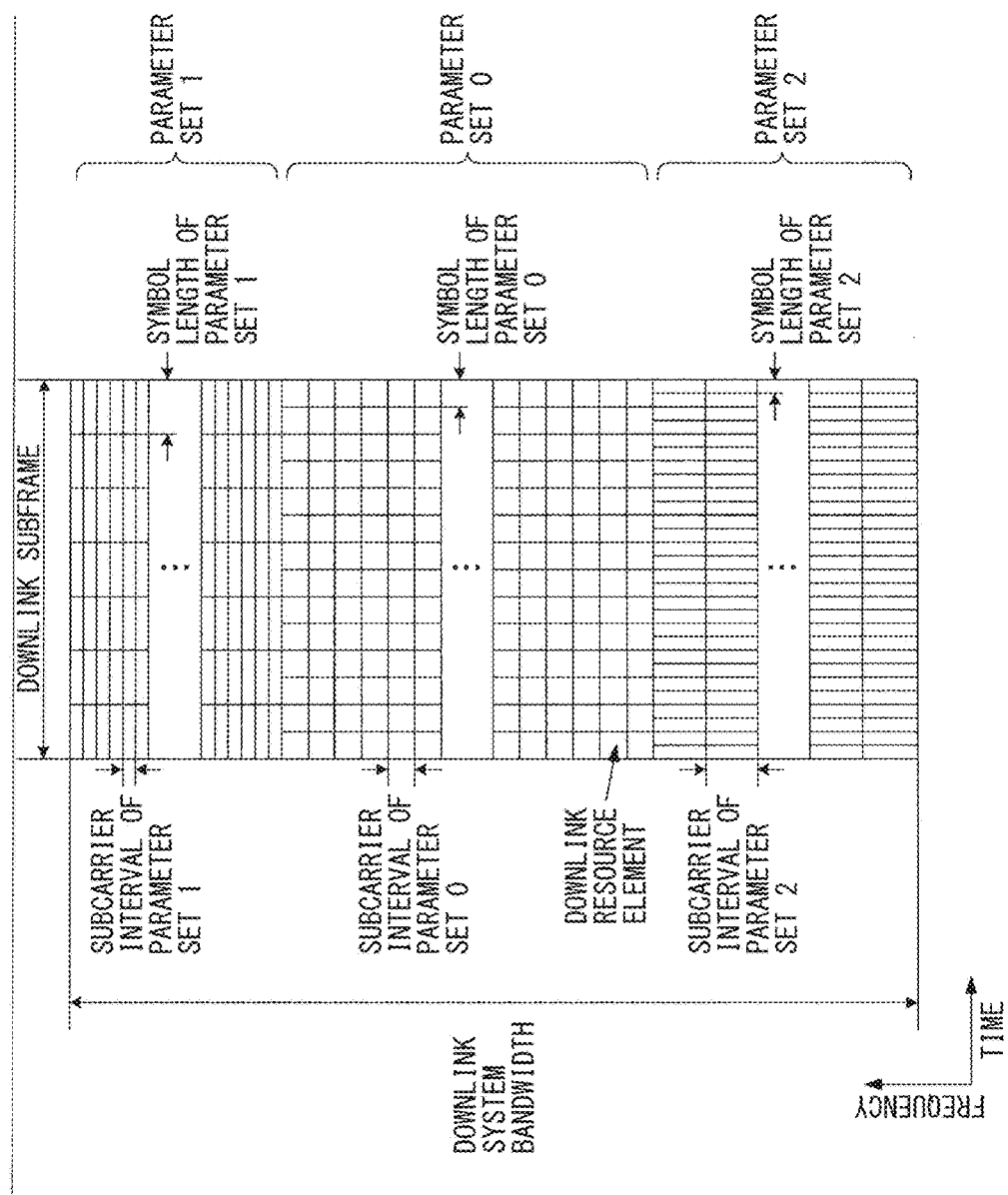
FIG. 3 is a diagram illustrating an example of a downlink subframe of NR according to the embodiment.

FIG. 3 is a diagram illustrating an example of an NR downlink subframe of the present embodiment. In the example of FIG. 3, signals generated using parameter set 1, parameter set 0, and parameter set 2 are subjected to FDM in a cell (system bandwidth). The diagram illustrated in FIG. 3 is also referred to as a downlink resource grid of NR. The base station device 100 can transmit the downlink physical channel of NR and/or the downlink physical signal of NR in a downlink subframe to the terminal device 200. The terminal device 200 can receive a downlink physical channel of NR and/or the downlink physical signal of NR in a downlink subframe from the base station device 100.

Figure 4:
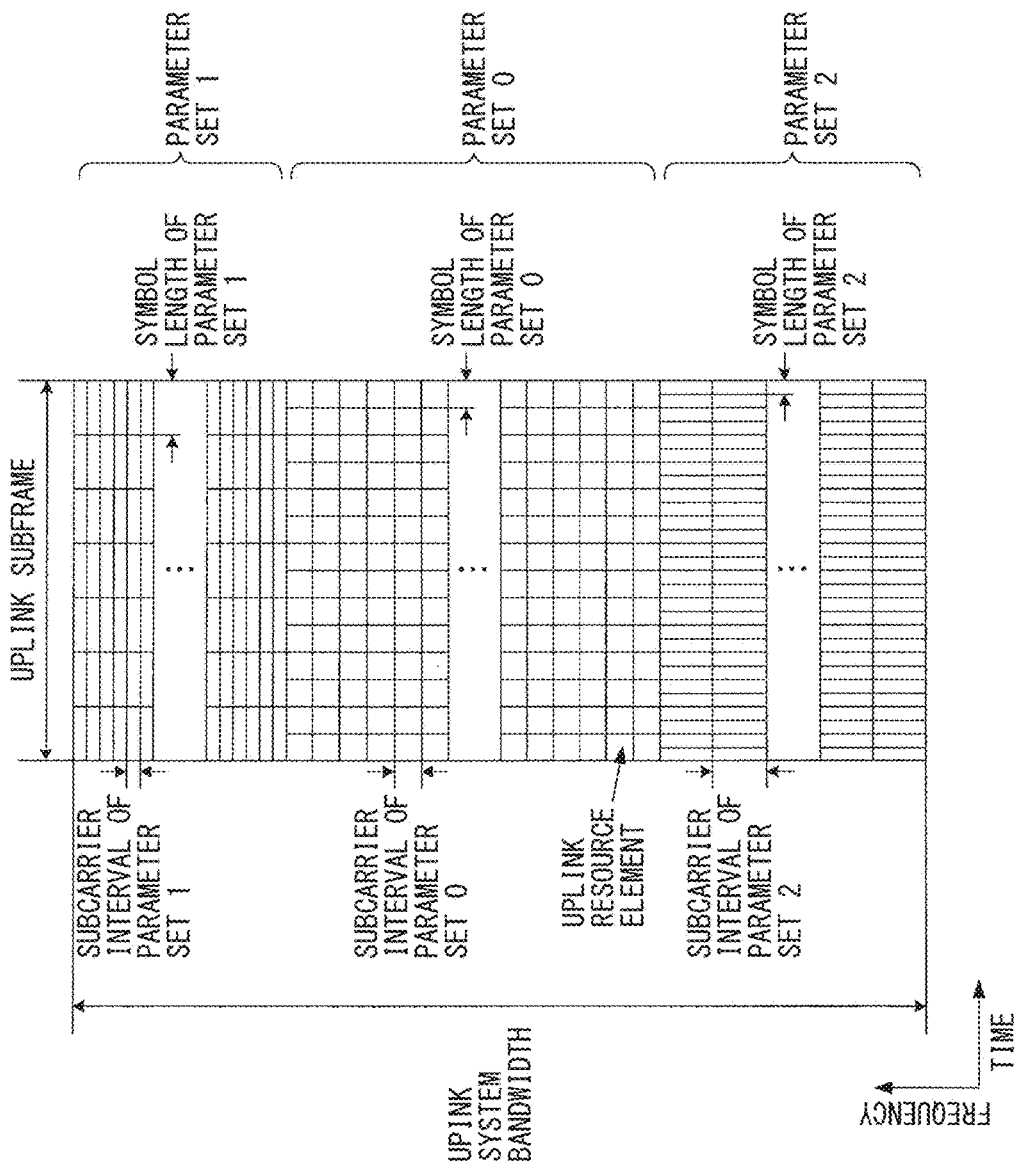
FIG. 4 is a diagram illustrating an example of an uplink subframe of NR according to the embodiment.

FIG. 4 is a diagram illustrating an example of an NR uplink subframe of the present embodiment. In the example of FIG. 4, signals generated using parameter set 1, parameter set 0, and parameter set 2 are subjected to FDM in a cell (system bandwidth). The diagram illustrated in FIG. 4 is also referred to as an uplink resource grid of NR. The base station device 100 can transmit the uplink physical channel of NR and/or the uplink physical signal of NR in an uplink subframe to the terminal device 200. The terminal device 200 can receive an uplink physical channel of NR and/or the uplink physical signal of NR in an uplink subframe from the base station device 100.

In the present embodiment, the physical resources may be defined as follows. One slot is defined by a plurality of symbols. The physical signal or the physical channel transmitted in each of the slots is represented by a resource grid. In the downlink, the resource grid is defined by a plurality of subcarriers in a frequency direction and a plurality of OFDM symbols in a time direction. In the uplink, the resource grid is defined by a plurality of subcarriers in the frequency direction and a plurality of OFDM symbols or SC-FDMA symbols in the time direction. The number of subcarriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a subcarrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive subcarriers in the frequency domain. The number of symbols and the number of subcarriers in one physical resource block are decided on the basis of a parameter set in accordance with a type of CP, a subcarrier interval, and/or a higher layer in the cell. For example, in a case in which the type of CP is the normal CP, and the subcarrier interval is 15 kHz, the number of symbols in one physical resource block is 7, and the number of subcarriers is 12. In this case, one physical resource block includes (7×12) resource elements. The physical resource blocks are numbered from 0 in the frequency domain. Further, two resource blocks in one subframe corresponding to the same physical resource block number are defined as a physical resource block pair (a PRB pair or an RB pair).

[Downlink Physical Channel According to Present Embodiment]

PBCH is used to broadcast MIB (Master Information Block) which is broadcast information specific to a serving cell of the base station device 100. SFN is a radio frame number (system frame number). MIB is system information. For example, MIB includes information indicating SFN.

PDCCH and EPDCCH are used to transmit downlink control information (DCI). Mapping of an information bit of the downlink control information is defined as a DCI format. The downlink control information includes a downlink grant and an uplink grant. The downlink grant is also referred to as downlink assignment or downlink allocation.

PDCCH is transmitted by a set of one or more CCEs (Control Channel Elements). CCE includes nine REGs (Resource Element Groups). REG includes four resource elements. In a case in which PDCCH includes n consecutive CCEs, PDCCH starts with CCE satisfying a condition that a remainder after dividing an index (number) i of CCE by n is 0.

EPDCCH is transmitted by contiguous one or more ECCEs (Enhanced Control Channel Elements). ECCE includes a plurality of EREGs (Enhanced Resource Element Groups).

The downlink grant is used for scheduling of PDSCH in a certain cell. The downlink grant is used for scheduling of PDSCH in the same subframe as a subframe in which the downlink grant is transmitted. An uplink grant is used for scheduling of PUSCH in a certain cell. The uplink grant is used for scheduling of a single PUSCH in a fourth subframe from a subframe in which the uplink grant is transmitted or later.

CRC (Cyclic Redundancy Check) parity bit is added to DCI. The CRC parity bit is scrambled using RNTI (Radio Network Temporary Identifier). RNTI is an identifier that can be specified or set in accordance with a purpose of DCI or the like. RNTI is an identifier specified in a specification in advance, an identifier set as information specific to a cell, an identifier set as information specific to the terminal device 200, or an identifier set as information specific to a group to which the terminal device 200 belongs. For example, in monitoring of PDCCH or EPDCCH, the terminal device 200 descrambles the CRC parity bit added to DCI with predetermined RNTI and identifies whether or not CRC is correct. In a case where CRC is correct, DCI is understood to be DCI for the terminal device 200.

PDSCH is used to transmit downlink data (Downlink Shared Channel (DL-SCH)). Further, PDSCH is also used to transmit control information of a higher layer.

In a PDCCH region, a plurality of PDCCHs may be multiplexed according to frequency, time, and/or space. In an EPDCCH region, a plurality of EPDCCHs may be multiplexed according to frequency, time, and/or space. In a PDSCH region, a plurality of PDSCHs may be multiplexed according to frequency, time, and/or space. PDCCH, PDSCH, and/or EPDCCH may be multiplexed according to frequency, time, and/or space.

[Downlink Physical Signal According to Present Embodiment]

A synchronization signal is used for the terminal device 200 to obtain downlink synchronization in the frequency domain and/or the time domain. The synchronization signal includes PSS (Primary Synchronization Signal) and SSS (Secondary Synchronization Signal). The synchronization signal is placed in a predetermined subframe in the radio frame. For example, in the TDD scheme, the synchronization signal is placed in the subframes 0, 1, 5, and 6 in the radio frame. In the FDD scheme, the synchronization signal is placed in the subframes 0 and 5 in the radio frame.

PSS may be used for coarse frame/symbol timing synchronization (synchronization in the time domain) or identification of a cell identification group. SSS may be used for more accurate frame timing synchronization, cell identification, or CP length detection. In other words, frame timing synchronization and cell identification can be performed using PSS and SSS.

The downlink reference signal is used for the terminal device 200 to perform propagation path estimation of the downlink physical channel, propagation path correction, calculation of CSI (downlink channel state information), and/or measurement of positioning of the terminal device 200.

URS associated with PDSCH is transmitted through a subframe and a band used for transmission of PDSCH with which URS is associated. The URS is used for demodulation of the PDSCH to which URS is associated. URS associated with PDSCH is transmitted through one or more of the antenna ports 5 and 7 to 14.

PDSCH is transmitted through an antenna port used for transmission of CRS or URS on the basis of the transmission mode and the DCI format. A DCI format 1A is used for scheduling of PDSCH transmitted through an antenna port used for transmission of CRS. A DCI format 2D is used for scheduling of PDSCH transmitted through an antenna port used for transmission of URS.

DMRS associated with EPDCCH is transmitted through a subframe and a band used for transmission of EPDCCH to which DMRS is associated. DMRS is used for demodulation of EPDCCH with which DMRS is associated. EPDCCH is transmitted through an antenna port used for transmission of DMRS. DMRS associated with EPDCCH is transmitted through one or more of the antenna ports 107 to 114.

CSI-RS is transmitted through a set subframe. The resources in which CSI-RS is transmitted are set by the base station device 100. CSI-RS is used for the terminal device 200 to calculate the downlink channel state information. The terminal device 200 performs signal measurement (channel measurement) using CSI-RS. CSI-RS supports setting of some or all of the antenna ports 1, 2, 4, 8, 12, 16, 24, and 32.

CSI-RS is transmitted through one or more of the antenna ports 15 to 46. Further, an antenna port to be supported may be decided on the basis of a terminal device 200 capability of the terminal device 200, setting of an RRC parameter, and/or a transmission mode to be set.

Resources of ZP CSI-RS are set by a higher layer. Resources of ZP CSI-RS may be transmitted with zero output power. In other words, the resources of the ZP CSI-RS may transmit nothing. PDSCH and EPDCCH are not transmitted in the resources in which ZP CSI-RS is set. For example, the resources of ZP CSI-RS are used for a neighbor cell to transmit NZP CSI-RS. Further, for example, the resources of ZP CSI-RS are used to measure CSI-IM. Further, for example, the resources of ZP CSI-RS are resources with which a predetermined channel such as PDSCH is not transmitted. In other words, the predetermined channel is mapped (to be rate-matched or punctured) except for the resources of ZP CSI-RS.

[Uplink Physical Channel According to Present Embodiment]

PUCCH is a physical channel used for transmitting UCI (uplink control information). The uplink control information includes downlink channel state information (CSI), a scheduling request (SR) indicating a request for PUSCH resources, and HARQ-ACK to downlink data (a transport block (TB) or a downlink-shared channel (DL-SCH)). HARQ-ACK is also referred to as ACK/NACK, HARQ feedback, or response information. Further, HARQ-ACK to downlink data indicates ACK, NACK, or DTX.

PUSCH is a physical channel used for transmitting uplink data (uplink-shared channel (UL-SCH)). Further, PUSCH may be used to transmit HARQ-ACK and/or the channel state information together with uplink data. Further, PUSCH may be used to transmit only the channel state information or only HARQ-ACK and the channel state information.

PRACH is a physical channel used for transmitting a random access preamble. The random access preamble is also referred to as PRACH preamble. It is possible to use PRACH for the terminal device 200 to obtain synchronization in the time domain with the base station device 100. Further, PRACH is also used to indicate an initial connection establishment procedure (process), a handover procedure, a connection re-establishment procedure, synchronization (timing adjustment) for uplink transmission, and/or a request for PUSCH resources.

In a PUCCH region, a plurality of PUCCHs are frequency, time, space, and/or code multiplexed. In a PUSCH region, a plurality of PUSCHs may be frequency, time, space, and/or code multiplexed. PUCCH and PUSCH may be frequency, time, space, and/or code multiplexed. PRACH may be placed over a single subframe or two subframes. A plurality of PRACHs may be code-multiplexed.

[Uplink Physical Signal According to Present Embodiment]

UL-DMRS is associated with transmission of PUSCH or PUCCH. UL-DMRS is time-multiplexed with PUSCH or PUCCH. The base station device 100 may use UL-DMRS to make propagation path correction of the PUSCH or PUCCH. In the description of the present embodiment, transmitting PUSCH also includes multiplexing and transmitting PUSCH and UL-DMRS. In the description of the present embodiment, transmitting PUCCH includes multiplexing and transmitting PUCCH and UL-DMRS.

SRS is not associated with transmission of PUSCH or PUCCH. The base station device 100 may use SRS to measure an uplink channel state.

SRS is transmitted by using the last symbol in an uplink subframe. That is, SRS is disposed in the last symbol in the uplink subframe. The terminal device 200 may limit simultaneous transmission of SRS and PUCCH, PUSCH and/or PRACH in a certain symbol of a cell. The terminal device 200 is able to transmit, in an uplink subframe of a cell, PUSCH and/or PUCCH using a symbol excluding the last symbol in the uplink subframe and SRS using the last symbol in the uplink subframe. That is, in an uplink subframe of a certain cell, the terminal device 200 is able to transmit SRS, PUSCH, and PUCCH.

In SRSs, a trigger type 0SRS and a trigger type 1SRS are defined as SRSs differing in trigger type. The trigger type 0SRS is transmitted in a case where the parameter related to the trigger type 0SRS is set by higher layer signaling. The trigger type 1SRS is transmitted in a case where the parameter related to the trigger type 1SRS is set by higher layer signaling and is requested to be transmitted by an SRS request included in DCI format 0, 1A, 2B, 2C, 2D, or 4. It is to be noted that the SRS request is included in both FDD and TDD for the DCI format 0, 1A, or 4, and only in TDD for the DCI format 2B, 2C or 2D. In a case where trigger type 0SRS transmission and trigger type 1SRS transmission occur in the same subframe of the same serving cell, the trigger type 1SRS transmission takes precedence. The trigger type 0SRS is also referred to as periodic SRS. Trigger type 1SRS is also referred to as non-periodic SRS.

[Configuration Example of Base Station Device 100 According to Present Embodiment]

Figure 5:
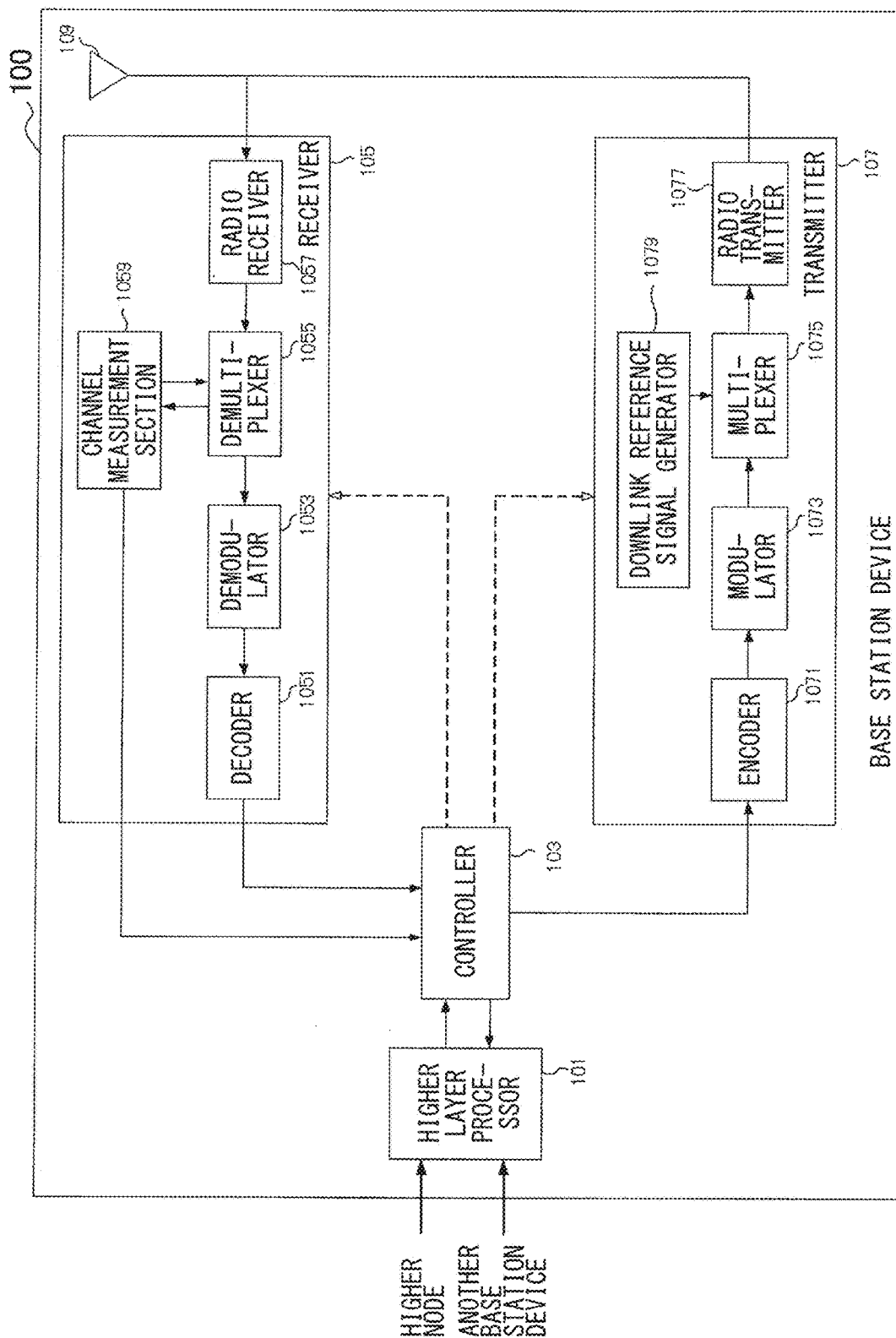
FIG. 5 is a schematic block diagram illustrating a configuration of a base station device according to the embodiment.

FIG. 5 is a schematic block diagram illustrating a configuration of the base station device 100 of the present embodiment. As illustrated in FIG. 5, the base station device 100 includes a higher layer processor 101, a controller 103, a receiver 105, a transmitter 107, and a transmission-reception antenna 109. Further, the receiver 105 includes a decoder 1051, a demodulator 1053, a demultiplexer 1055, a radio receiver 1057, and a channel measurement section 1059. Further, the transmitter 107 includes an encoder 1071, a modulator 1073, a multiplexer 1075, a radio transmitter 1077, and a downlink reference signal generator 1079.

As described above, the base station device 100 can support one or more RATs. Some or all of the sections included in the base station device 100 illustrated in FIG. 5 can be configured individually in accordance with RAT. For example, the receiver 105 and the transmitter 107 are configured individually in LTE and NR. Further, in the NR cell, some or all of the sections included in the base station device 100 illustrated in FIG. 5 can be configured individually in accordance with a parameter set related to the transmission signal. For example, in a certain NR cell, the radio receiver 1057 and the radio transmitter 1077 can be configured individually in accordance with a parameter set related to the transmission signal.

The higher layer processor 101 performs processes of a medium access control (MAC) layer, a packet data convergence protocol (PDCP) layer, a radio link control (RLC) layer, and a radio resource control (RRC) layer. Further, the higher layer processor 101 generates control information to control the receiver 105 and the transmitter 107 and outputs the control information to the controller 103.

The controller 103 controls the receiver 105 and the transmitter 107 on the basis of the control information from the higher layer processor 101. The controller 103 generates control information to be transmitted to the higher layer processor 101 and outputs the control information to the higher layer processor 101. The controller 103 receives a decoded signal from the decoder 1051 and a channel estimation result from the channel measurement section 1059. The controller 103 outputs a signal to be encoded to the encoder 1071. Further, the controller 103 is used to control the whole or a part of the base station device 100.

The higher layer processor 101 performs a process and management related to RAT control, radio resource control, subframe setting, scheduling control, and/or CSI report control. The process and the management in the higher layer processor 101 are performed for each terminal device 200 or in common to terminal devices 200 connected to the base station device 100. The process and the management in the higher layer processor 101 may be performed only by the higher layer processor 101 or may be acquired from a higher node or another base station device 100. Further, the process and the management in the higher layer processor 101 may be individually performed in accordance with RAT. For example, the higher layer processor 101 individually performs the process and the management in LTE and the process and the management in NR.

Under the RAT control of the higher layer processor 101, management related to RAT is performed. For example, under the RAT control, the management related to LTE and/or the management related to NR is performed. The management related to NR includes setting and a process of a parameter set related to the transmission signal in the NR cell.

In the radio resource control in the higher layer processor 101, generation and/or management of downlink data (transport block), system information, an RRC message (RRC parameter), and/or a MAC control element (CE) are performed.

In a subframe setting in the higher layer processor 101, management of a subframe setting, a subframe pattern setting, an uplink-downlink setting, an uplink reference UL-DL setting, and/or a downlink reference UL-DL setting is performed. Further, the subframe setting in the higher layer processor 101 is also referred to as a base station subframe setting. Further, the subframe setting in the higher layer processor 101 can be decided on the basis of an uplink traffic volume and a downlink traffic volume. Further, the subframe setting in the higher layer processor 101 can be decided on the basis of a scheduling result of scheduling control in the higher layer processor 101.

In the scheduling control in the higher layer processor 101, a frequency and a subframe to which the physical channel is allocated, a coding rate, a modulation scheme, and transmission power of the physical channels, and the like are decided on the basis of the received channel state information, an estimation value, a channel quality, or the like of a propagation path inputted from the channel measurement section 1059, and the like. For example, the controller 103 generates the control information (DCI format) on the basis of the scheduling result of the scheduling control in the higher layer processor 101.

In the CSI report control in the higher layer processor 101, the CSI report of the terminal device 200 is controlled. For example, a settings related to the CSI reference resources assumed to calculate CSI in the terminal device 200 is controlled.

Under the control from the controller 103, the receiver 105 receives a signal transmitted from the terminal device 200 via the transmission-reception antenna 109, performs a reception process such as demultiplexing, demodulation, and decoding, and outputs information which has undergone the reception process to the controller 103. Note that, the reception process in the receiver 105 is performed on the basis of a setting which is specified in advance or a setting notified from the base station device 100 to the terminal device 200.

The radio receiver 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transmission-reception antenna 109.

The demultiplexer 1055 separates the uplink channel such as the PUCCH or the PUSCH and/or uplink reference signal from the signal input from the radio receiver 1057. The demultiplexer 1055 outputs the uplink reference signal to the channel measurement section 1059. The demultiplexer 1055 compensates the propagation path for the uplink channel from the estimation value of the propagation path input from the channel measurement section 1059.

The demodulator 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulator 1053 performs separation and demodulation of a MIMO multiplexed uplink channel.

The decoder 1051 performs a decoding process on encoded bits of the demodulated uplink channel. The decoded uplink data and/or uplink control information are output to the controller 103. The decoder 1051 performs a decoding process on PUSCH for each transport block.

The channel measurement section 1059 measures the estimation value, a channel quality, and/or the like of the propagation path from the uplink reference signal input from the demultiplexer 1055, and outputs the estimation value, a channel quality, and/or the like of the propagation path to the demultiplexer 1055 and/or the controller 103. For example, the channel measurement section 1059 measures the estimation value of the propagation path for propagation path compensation for PUCCH or the PUSCH using UL-DMRS, and measures an uplink channel quality using SRS.

The transmitter 107 carries out a transmission process such as encoding, modulation, and multiplexing on downlink control information and downlink data input from the higher layer processor 101 under the control of the controller 103. For example, the transmitter 107 generates and multiplexes PHICH, PDCCH, EPDCCH, PDSCH, and the downlink reference signal and generates a transmission signal. Further, the transmission process in the transmitter 107 is performed on the basis of a setting which is specified in advance, a setting notified from the base station device 100 to the terminal device 200, or a setting notified through PDCCH or EPDCCH transmitted through the same subframe.

The encoder 1071 encodes the HARQ indicator (HARQ-ACK), the downlink control information, and the downlink data input from the controller 103 using a predetermined coding scheme such as block coding, convolutional coding, turbo coding, or the like. The modulator 1073 modulates the encoded bits input from the encoder 1071 using a predetermined modulation scheme such as BPSK, QPSK, 16 QAM, 64 QAM, or 256 QAM. The downlink reference signal generator 1079 generates the downlink reference signal on the basis of a physical cell identification (PCI), an RRC parameter set in the terminal device 200, and the like. The multiplexer 1075 multiplexes a modulated symbol and the downlink reference signal of each channel and arranges resulting data in a predetermined resource element.

The radio transmitter 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexer 1075, and generates a transmission signal. The transmission signal output from the radio transmitter 1077 is transmitted through the transmission-reception antenna 109.

[Configuration Example of Terminal Device 200 According to Present Embodiment]

Figure 6:
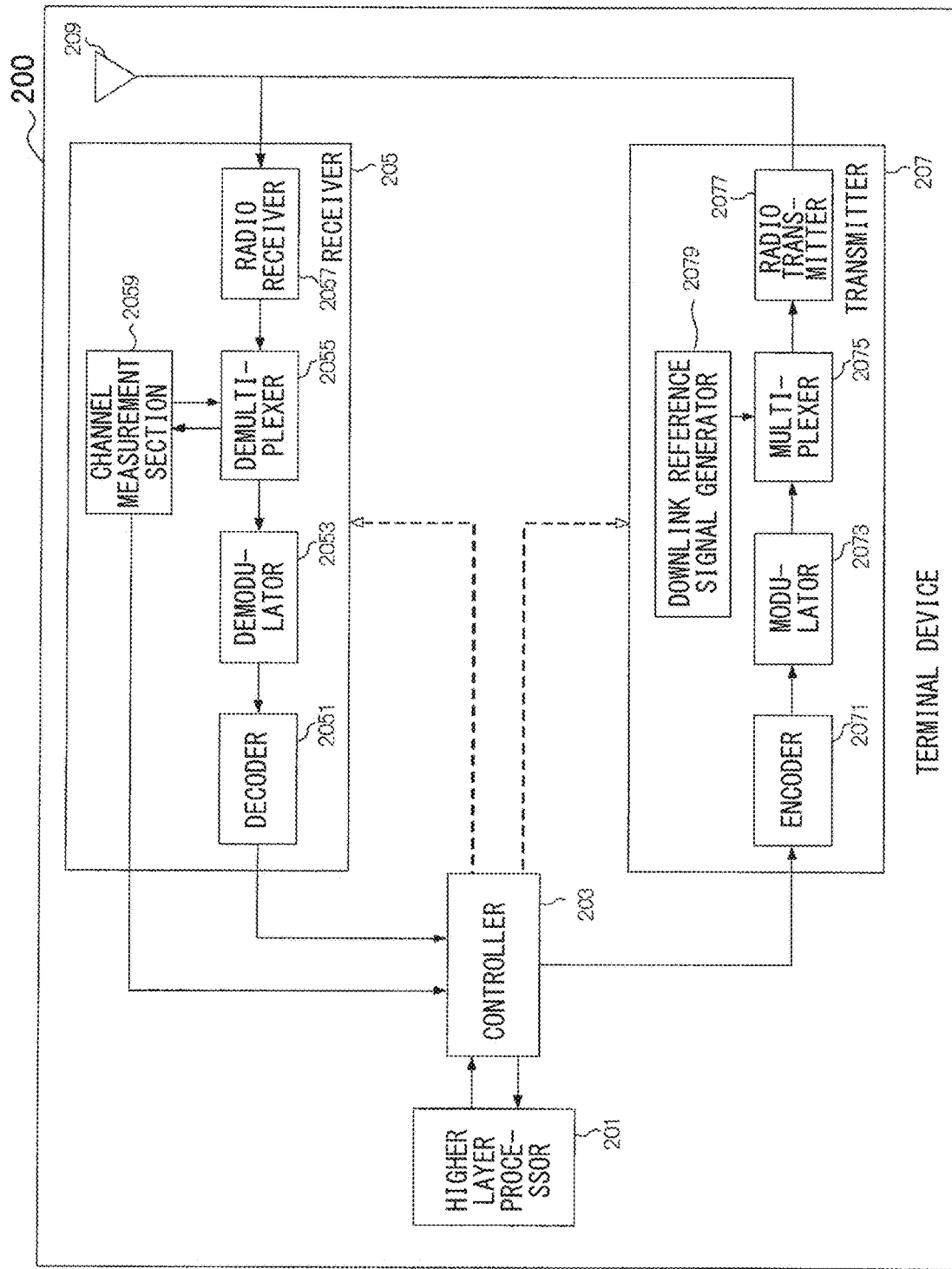
FIG. 6 is a schematic block diagram illustrating a configuration of a terminal device according to the embodiment.

FIG. 6 is a schematic block diagram illustrating a configuration of the terminal device 200 of the present embodiment. As illustrated in FIG. 6, the terminal device 200 includes a higher layer processor 201, a controller 203, a receiver 205, a transmitter 207, and a transmission-reception antenna 209. Further, the receiver 205 includes a decoder 2051, a demodulator 2053, a demultiplexer 2055, a radio receiver 2057, and a channel measurement section 2059. Further, the transmitter 207 includes an encoder 2071, a modulator 2073, a multiplexer 2075, a radio transmitter 2077, and an uplink reference signal generator 2079.

As described above, the terminal device 200 can support one or more RATs. Some or all of the sections included in the terminal device 200 illustrated in FIG. 6 can be configured individually in accordance with the RAT. For example, the receiver 205 and the transmitter 207 are configured individually in LTE and NR. Further, in the NR cell, some or all of the sections included in the terminal device 200 illustrated in FIG. 6 can be configured individually in accordance with a parameter set related to the transmission signal. For example, in a certain NR cell, the radio receiver 2057 and the radio transmitter 2077 can be configured individually in accordance with a parameter set related to the transmission signal.

The higher layer processor 201 outputs uplink data (transport block) to the controller 203. The higher layer processor 201 performs processes of a medium access control (MAC) layer, a packet data convergence protocol (PDCP) layer, a radio link control (RLC) layer, and a radio resource control (RRC) layer. Further, the higher layer processor 201 generates control information to control the receiver 205 and the transmitter 207 and outputs the control information to the controller 203.

The controller 203 controls the receiver 205 and the transmitter 207 on the basis of the control information from the higher layer processor 201. The controller 203 generates control information to be transmitted to the higher layer processor 201 and outputs the control information to the higher layer processor 201. The controller 203 receives a decoded signal from the decoder 2051 and a channel estimation result from the channel measurement section 2059. The controller 203 outputs a signal to be encoded to the encoder 2071. Further, the controller 203 may be used to control the whole or a part of the terminal device 200.

The higher layer processor 201 performs a process and management related to RAT control, radio resource control, subframe setting, scheduling control, and/or CSI report control. The process and the management in the higher layer processor 201 are performed on the basis of a setting which is specified in advance and/or a setting based on control information set or notified from the base station device 100. For example, the control information from the base station device 100 includes the RRC parameter, the MAC control element, or DCI. Further, the process and the management in the higher layer processor 201 may be individually performed in accordance with RAT. For example, the higher layer processor 201 individually performs the process and the management in LTE and the process and the management in NR.

Under the RAT control of the higher layer processor 201, management related to RAT is performed. For example, under the RAT control, the management related to LTE and/or the management related to NR is performed. The management related to NR includes setting and a process of a parameter set related to the transmission signal in the NR cell.

In the radio resource control in the higher layer processor 201, the setting information in the own device is managed. In the radio resource control in the higher layer processor 201, generation and/or management of uplink data (transport block), system information, the RRC message (RRC parameter), and/or the MAC control element (CE) are performed.

In the subframe setting in the higher layer processor 201, the subframe setting in the base station device 100 and/or a base station device 100 different from the base station device 100 is managed. The subframe setting includes an uplink or downlink setting for the subframe, a subframe pattern setting, an uplink-downlink setting, an uplink reference UL-DL setting, and/or a downlink reference UL-DL setting. Further, the subframe setting in the higher layer processor 201 is also referred to as a terminal subframe setting.

In the scheduling control in the higher layer processor 201, control information for controlling scheduling on the receiver 205 and the transmitter 207 is generated on the basis of the DCI (scheduling information) from the base station device 100.

In the CSI report control in the higher layer processor 201, control related to the report of the CSI to the base station device 100 is performed. For example, in the CSI report control, a setting related to the CSI reference resources assumed for calculating the CSI by the channel measurement section 2059 is controlled. In the CSI report control, resource (timing) used for reporting the CSI is controlled on the basis of the DCI and/or the RRC parameter.

Under the control from the controller 203, the receiver 205 receives a signal transmitted from the base station device 100 via the transmission-reception antenna 209, performs a reception process such as demultiplexing, demodulation, and decoding, and outputs information which has undergone the reception process to the controller 203. Note that, the reception process in the receiver 205 is performed on the basis of a setting which is specified in advance or a notification from the base station device 100 or a setting.

The radio receiver 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transmission-reception antenna 209.

The demultiplexer 2055 separates the downlink channel such as PHICH, PDCCH, EPDCCH, or PDSCH, downlink synchronization signal and/or downlink reference signal from the signal input from the radio receiver 2057. The demultiplexer 2055 outputs the uplink reference signal to the channel measurement section 2059. The demultiplexer 2055 compensates the propagation path for the uplink channel from the estimation value of the propagation path input from the channel measurement section 2059.

The demodulator 2053 demodulates the reception signal for the modulation symbol of the downlink channel using a modulation scheme such as BPSK, QPSK, 16 QAM, 64 QAM, or 256 QAM. The demodulator 2053 performs separation and demodulation of a MIMO multiplexed downlink channel.

The decoder 2051 performs a decoding process on encoded bits of the demodulated downlink channel. The decoded downlink data and/or downlink control information are output to the controller 203. The decoder 2051 performs a decoding process on PDSCH for each transport block.

The channel measurement section 2059 measures the estimation value, a channel quality, and/or the like of the propagation path from the downlink reference signal input from the demultiplexer 2055, and outputs the estimation value, a channel quality, and/or the like of the propagation path to the demultiplexer 2055 and/or the controller 203. The downlink reference signal used for measurement by the channel measurement section 2059 may be decided on the basis of at least a transmission mode set by the RRC parameter and/or other RRC parameters. For example, the estimation value of the propagation path for performing the propagation path compensation on PDSCH or EPDCCH is measured through DL-DMRS. The estimation value of the propagation path for performing the propagation path compensation on PDCCH or PDSCH and/or the downlink channel for reporting CSI are measured through CRS. The downlink channel for reporting CSI is measured through CSI-RS. The channel measurement section 2059 calculates a reference signal received power (RSRP) and/or a reference signal received quality (RSRQ) on the basis of CRS, CSI-RS, or the discovery signal, and outputs RSRP and/or RSRQ to the higher layer processor 201.

The transmitter 207 performs a transmission process such as encoding, modulation, and multiplexing on the uplink control information and the uplink data input from the higher layer processor 201 under the control of the controller 203. For example, the transmitter 207 generates and multiplexes the uplink channel such as PUSCH or PUCCH and/or the uplink reference signal, and generates a transmission signal. Note that, the transmission process in the transmitter 207 is performed on the basis of a setting which is specified in advance or a setting set or notified from the base station device 100.

The encoder 2071 encodes the HARQ indicator (HARQ-ACK), the uplink control information, and the uplink data input from the controller 203 using a predetermined coding scheme such as block coding, convolutional coding, turbo coding, or the like. The modulator 2073 modulates the encoded bits input from the encoder 2071 using a predetermined modulation scheme such as BPSK, QPSK, 16 QAM, 64 QAM, or 256 QAM. The uplink reference signal generator 2079 generates the uplink reference signal on the basis of an RRC parameter set in the terminal device 200, and the like. The multiplexer 2075 multiplexes a modulated symbol and the uplink reference signal of each channel and arranges resulting data in a predetermined resource element.

The radio transmitter 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexer 2075, and generates a transmission signal. The transmission signal output from the radio transmitter 2077 is transmitted through the transmission-reception antenna 209.

[Signaling of Control Information According to Present Embodiment]

The base station device 100 and the terminal device 200 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 200 of the control information specific or a common RRC signaling for notifying of the control information specific to the base station device 100. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using PDSCH or PUSCH. DCI is transmitted using PDCCH or EPDCCH. UCI is transmitted using PUCCH or PUSCH. The RRC signaling and the MAC signaling are used for signaling semi-static control information and are also referred to as semi-static signaling. The signaling of the physical layer is used for signaling dynamic control information and also referred to as dynamic signaling. DCI is used for scheduling of PDSCH or scheduling of PUSCH. UCI is used for the CSI report, the HARQ-ACK report, and/or the scheduling request (SR).

[Details of Downlink Control Information According to Present Embodiment]

DCI is notified using the DCI format having a field which is specified in advance. Predetermined information bits are mapped to the field specified in the DCI format. DCI notifies downlink scheduling information, uplink scheduling information, sidelink scheduling information, a request for a non-periodic CSI report, or an uplink transmission power command.

The DCI format monitored by the terminal device 200 is decided in accordance with the transmission mode set for each serving cell. In other words, a part of the DCI format monitored by the terminal device 200 can differ depending on the transmission mode. For example, the terminal device 200 in which a downlink transmission mode 1 is set monitors the DCI format 1A and the DCI format 1. For example, the terminal device 200 in which a downlink transmission mode 4 is set monitors the DCI format 1A and the DCI format 2. For example, the terminal device 200 in which an uplink transmission mode 1 is set monitors the DCI format 0. For example, the terminal device 200 in which an uplink transmission mode 2 is set monitors the DCI format 0 and the DCI format 4.

A control region in which PDCCH for notifying the terminal device 200 of DCI is placed is not notified of, and the terminal device 200 detects DCI for the terminal device 200 through blind decoding (blind detection). Specifically, the terminal device 200 monitors a set of PDCCH candidates in the serving cell. The monitoring indicates that decoding is attempted in accordance with all the DCI formats to be monitored for each of PDCCHs in the set. For example, the terminal device 200 attempts to decode all aggregation levels, PDCCH candidates, and DCI formats which are likely to be transmitted to the terminal device 200. The terminal device 200 recognizes DCI (PDCCH) which is successfully decoded (detected) as DCI (PDCCH) for the terminal device 200.

A cyclic redundancy check (CRC) is added to DCI. CRC is used for the DCI error detection and the DCI blind detection. A CRC parity bit (CRC) is scrambled using RNTI (Radio Network Temporary Identifier). The terminal device 200 detects whether or not it is DCI for the terminal device 200 on the basis of RNTI. Specifically, the terminal device 200 performs de-scrambling on the bit corresponding to CRC using a predetermined RNTI, extracts CRC, and detects whether or not the corresponding DCI is correct.

RNTI is specified or set in accordance with a purpose of DCI or a use to which DCI is applied. RNTI includes C-RNTI (Cell-RNTI), SPS C-RNTI (Semi Persistent Scheduling C-RNTI), SI-RNTI (System Information-RNTI), P-RNTI (Paging-RNTI), RA-RNTI (Random Access-RNTI), TPC-PUCCH-RNTI (Transmit Power Control-PUCCH-RNTI), TPC-PUSCH-RNTI (Transmit Power Control-PUSCH-RNTI), temporary C-RNTI, M-RNTI (MBMS (Multimedia Broadcast Multicast Services)—RNTI), eIMTA-RNTI, and CC-RNTI.

C-RNTI and SPS C-RNTI are RNTIs which are specific to the terminal device 200 in the base station device 100 (cell), and serve as identifiers identifying the terminal device 200. C-RNTI is used for scheduling PDSCH or PUSCH in a certain subframe. SPS C-RNTI is used to activate or release periodic scheduling of resources for PDSCH or PUSCH. A control channel having CRC scrambled using SI-RNTI is used for scheduling a system information block (SIB). A control channel with CRC scrambled using P-RNTI is used for controlling paging. A control channel with CRC scrambled using RA-RNTI is used for scheduling a response to RACH. A control channel having CRC scrambled using TPC-PUCCH-RNTI is used for power control of PUCCH. A control channel having CRC scrambled using TPC-PUSCH-RNTI is used for power control of PUSCH. A control channel with CRC scrambled using the temporary C-RNTI is used by a mobile station device in which no C-RNTI is set or recognized. A control channel with CRC scrambled using M-RNTI is used for scheduling MBMS. A control channel with CRC scrambled using eIMTA-RNTI is used for notification of information related to TDD UL/DL setting of a TDD serving cell in dynamic TDD (eIMTA). A control channel (DCI) with a CRC scrambled using CC-RNTI is used to notify of setting of an exclusive OFDM symbol in the LAA secondary cell. Further, the DCI format may be scrambled using new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device 200. A size of the resource block group is decided in accordance with a system bandwidth.

[Details of Downlink Control Channel According to Present Embodiment]

DCI is transmitted using a control channel such as PDCCH or EPDCCH. The terminal device 200 monitors a set of PDCCH candidates and/or a set of EPDCCH candidates of one or more activated serving cells set by RRC signaling. Here, the monitoring means that PDCCH and/or EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. CSS may be defined only for the search space for PDCCH.

A common search space (CSS) is a search space set on the basis of a parameter specific to the base station device 100 and/or a parameter which is specified in advance. For example, CSS is a search space used in common to a plurality of terminal devices 200. Therefore, the base station device 100 maps a control channel common to a plurality of terminal devices 200 to CSS, and thus resources for transmitting the control channel are reduced.

A UE-specific search space (USS) is a search space set using at least a parameter specific to the terminal device 200. Therefore, the USS is a search space specific to the terminal device 200, and it is possible for the base station device 100 to individually transmit the control channel specific to the terminal device 200 by using USS. For this reason, the base station device 100 is able to efficiently map the control channels specific to a plurality of terminal devices 200.

USS may be set to be used in common to a plurality of terminal devices 200. Since a common USS is set in a plurality of terminal devices 200, a parameter specific to the terminal device 200 is set to be the same value among a plurality of terminal devices 200. For example, a unit set to the same parameter among a plurality of terminal devices 200 is a cell, a transmission point, a group of predetermined terminal devices 200, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The number of PDCCH candidates is decided on the basis of at least the search space and the aggregation level. For example, in CSS, the number of PDCCH candidates in the aggregation levels 4 and 8 are 4 and 2, respectively. For example, in USS, the number of PDCCH candidates in the aggregations 1, 2, 4, and 8 are 6, 6, 2, and 2, respectively.

[Details of Resource Allocation According to Present Embodiment]

The base station device 100 is able to use a plurality of methods as a method of allocating resources of PDSCH and/or PUSCH to the terminal device 200. The resource allocation method includes dynamic scheduling, semi persistent scheduling, multi subframe scheduling, and cross subframe scheduling.

In the dynamic scheduling, one DCI performs resource allocation in one subframe. Specifically, the PDCCH or the EPDCCH in a certain subframe performs scheduling for the PDSCH in the subframe. PDCCH or EPDCCH in a certain subframe performs scheduling for PUSCH in a predetermined subframe after the certain subframe.

[State of NR Terminal Device 200 According to Present Embodiment]

The terminal device 200 of NR supports three states: RRC idle (RRC IDLE, idle state, idle mode, RRC idle state, RRC idle mode); RRC inactive (RRC INACTIVE, inactive state, inactive mode, RRC inactive state, RRC inactive mode); and RRC connection (RRC CONNECTED, connected state, RRC connected state, connected mode, RRC connected mode).

The RRC idle is a state of not being connected to a cell, such as immediately after the power is turned on or outside the service area. In the RRC idle, functions such as cell reconnection mobility, paging initialized by a core network (CN), a paging area managed by the core network, etc. are supported.

The RRC inactive is a state of being connected to a cell and being provided with information, but not being able to perform transmission and reception or the like of unicast data cannot be performed. The RRC inactive supports functions such as cell reconnection mobility, establishing core network (CN) and RAN (Radio Access Network) connections to the terminal device 200, storing UE AS context, paging initialized by the core network (CN), RAN-based notification area managed by the RAN, and RAN-side recognition of the RAN-based notification area to which the terminal device 200 belongs.

The RRC connection is a state of being connected to a cell, and being able to perform transmission and reception of unicast data. The RRC connection supports the following functions such as RRC connection of the terminal device 200, AS context retention of the terminal device 200, RAN-side recognition of the cell to which the terminal device 200 belongs, forwarding of unicast data to the terminal device 200 and/or unicast data from the terminal device 200, network-managed mobility, etc.

[Initial Connection Procedure According to Present Embodiment]

Initial connection is a process in which the terminal device 200 transitions from a state of not being connected to any cell (idle state) to a state of having established a connection with any cell (connected state).

Figure 7:
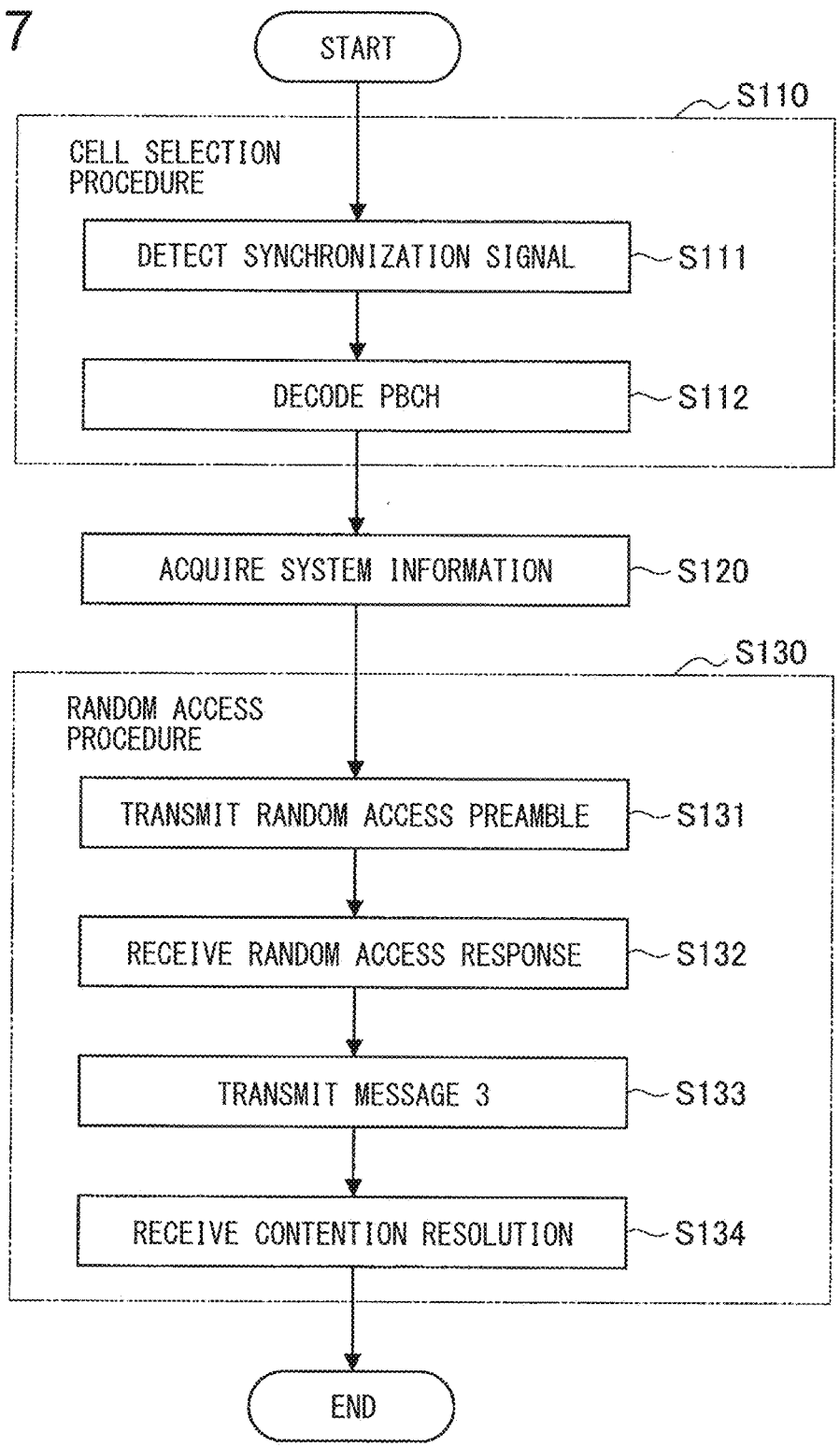
FIG. 7 is a flowchart illustrating an example of an initial connection procedure of the terminal device according to the embodiment.

FIG. 7 is a flow chart showing an example of an initial connection procedure of the terminal device 200 according to the present embodiment. As illustrated in FIG. 7, the terminal device 200 in the idle state performs a cell selection procedure (step S110). The cell selection procedure includes processes of detecting a synchronization signal (step S111) and decoding PBCH (step S112). The terminal device 200 performs synchronization between the cell and the downlink on the basis of the detection of the synchronization signal. After establishing downlink synchronization, the terminal device 200 attempts to decode PBCH and acquires first system information.

Next, the terminal device 200 acquires second system information on the basis of the first system information included in PBCH (step S120).

Next, the terminal device 200 performs a random access procedure (RACH procedure) on the basis of the first system information and/or the second system information (step S130). The random access procedure includes processes of transmitting a random access preamble (step S131), receiving a random access response (step S132), transmitting Message 3 (step S133), and receiving Contention resolution (step S134). The terminal device 200 first selects a predetermined PRACH preamble and transmits the predetermined PRACH preamble. The terminal device 200 then receives PDSCH containing a random access response corresponding to the transmitted PRACH preamble. The terminal device 200 then transmits PUSCH containing Message 3 using a resource scheduled by a random access response grant included in the received random access response. Finally, the terminal device 200 receives PDSCH containing a contention resolution corresponding to PUSCH.

Message 3 contains an RRC message of an RRC connection request. Contention resolution includes an RRC message of RRC connection setup. When receiving the RRC message of the RRC connection setup, the terminal device 200 performs RRC connection operation, and transitions from the RRC idle state to the RRC connected state. After transitioning to the RRC connected state, the terminal device 200 transmits the RRC message to the base station device 100, the RRC message indicating that the RRC connection setup has been completed. Owing to this series of operations, the terminal device 200 is able to be connected to the base station device 100.

The random access preamble is also referred to as Message 1, the random access response is referred to as Message 2, the contention resolution is referred to as Message 4, and the RRC connection setup complete message is also referred to as Message 5.

After all steps of the random access procedure have been completed, the terminal device 200 is able to transition to a state connected to the cell.

The random access procedure illustrated in FIG. 7 is also referred to as four-step RACH procedure. In contrast, the random access procedure in which the terminal device 200 also transmits Message 3 in association with the transmission of the random access preamble, and the base station device 100 transmits the random access response and Contention resolution in response thereto is referred to as two-step RACH procedure.

The random access preamble is transmitted in association with PRACH. The random access response is transmitted in PDSCH. PDSCH containing the random access responses is scheduled in PDCCH. Message 3 is transmitted in PUSCH. PUSCH containing Message 3 is scheduled by the uplink grant included in the random access response.

[Details of Synchronization Signal Block of NR According to Present Embodiment]

In NR, a predetermined block (hereinafter referred to as synchronization signal block) in which one NR-PSS, one NR-SSS, and/or NR-PBCH are/is transmitted is defined. For a temporal instance of the predetermined synchronization signal block, the terminal device 200 assumes one beam on which NR-SS and/or NR-PBCH are/is transmitted. One NR-PSS, one NR-SSS, and/or one NR-PBCH are/is multiplexed in the synchronization signal block by time division, frequency division, spatial division, and/or code division.

It is to be noted that the synchronization signal block may include MRS (Mobility RS, Mobility Reference Signal). MRS is used for at least RRM measurement. The terminal device 200 measures RSRP and/or RSRQ using MRS. A CSI-RS configuration may be used for MRS. The sequence of MRS may be scrambled by a time index.

Figure 8:
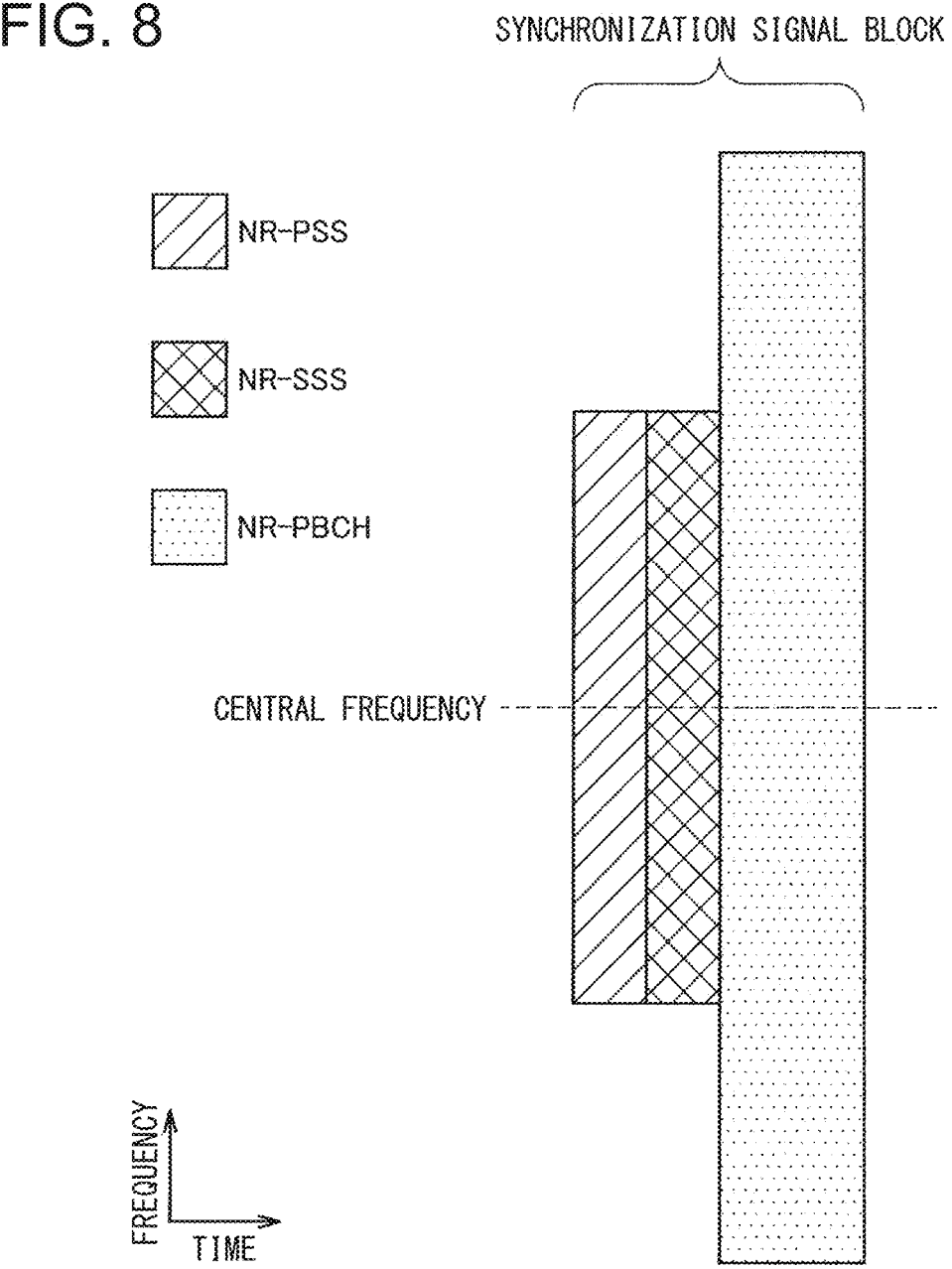
FIG. 8 is a diagram illustrating an example of a configuration of a synchronization signal block according to the embodiment.

FIG. 8 is a diagram illustrating an example of a configuration of the synchronization signal block. In FIG. 8, in one synchronization signal block, NR-PSS, NR-SSS, and NR-PBCH are multiplexed by time division. The terminal device 200 assumes that the transmission is performed at a predetermined central frequency and a predetermined bandwidth, and detects NR-SS and receives NR-PBCH.

Figure 9:
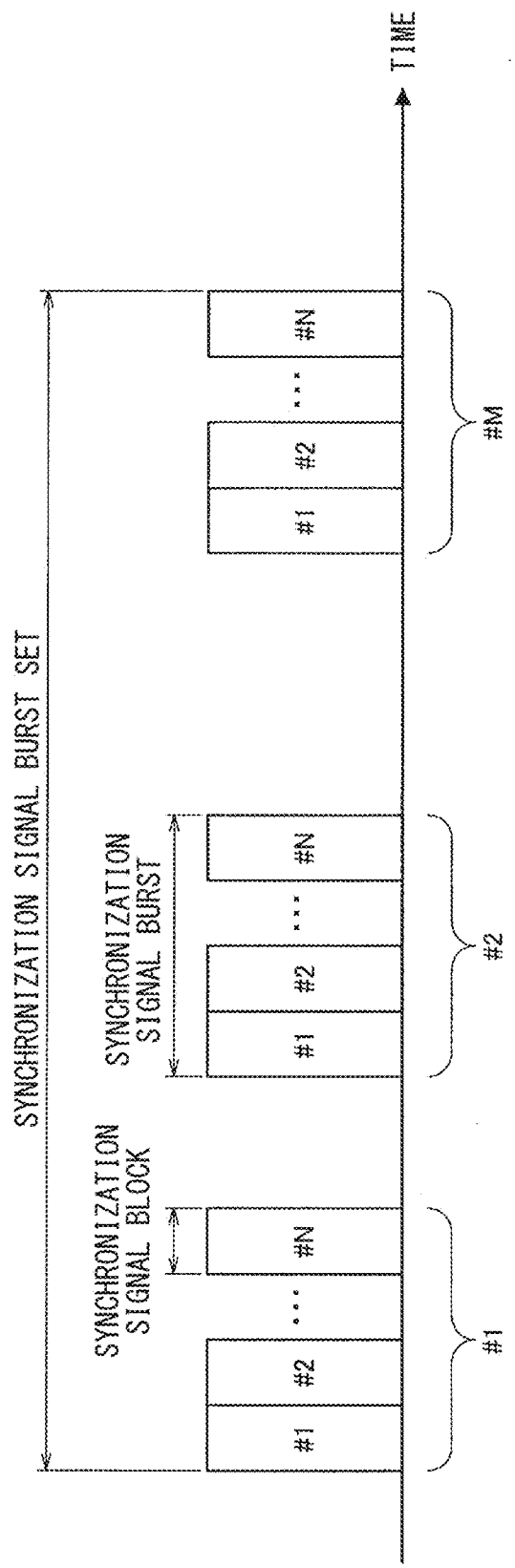
FIG. 9 is a diagram illustrating an example of a configuration of a synchronization signal burst and a synchronization signal burst set according to the embodiment.

FIG. 9 is a diagram illustrating an example of a configuration of a synchronization signal burst and a synchronization signal burst set. In NR, the synchronization signal burst illustrated in FIG. 9 is defined. The synchronization signal burst includes one or more synchronization signal blocks. In the case illustrated in FIG. 9, N-number of synchronization signal blocks are defined as a synchronization signal burst. Each synchronization signal block in the synchronization signal burst may be contiguous.

In NR, the synchronization signal burst set illustrated in FIG. 9 is defined. The synchronization signal burst set includes one or more synchronization signal bursts. In the case illustrated in FIG. 9, M-number of synchronization signal bursts are defined as one synchronization signal burst set.

The terminal device 200 assumes that the synchronization signal burst set is periodically transmitted, and synchronizes with the NR cell. The terminal device 200 performs a process assuming that the synchronization signal burst set is periodically transmitted. In contrast, the base station device 100 does not necessarily transmit the synchronization signal burst set at a predetermined time instance. At initial connection, the terminal device 200 attempts to detect the synchronization signal burst set assuming an initial cycle. The cycle of the synchronization signal burst set may be set by the higher layer. The terminal device 200 may overwrite the set cycle if the higher layer has performed the setting.

It is to be noted that synchronization signal burst sets transmitted at different temporal instances are not necessarily transmitted at the same antenna ports and TRPs.

It is to be noted that it is preferable that one of the subframes in which the synchronization signal burst set is placed is subframe #0. In other words, the synchronization signal burst set is preferably placed in subframe #0. The terminal device 200 is able to recognize the subframe number of each time by recognizing the head of each synchronization signal burst set.

Each synchronization signal block is assigned an index (time index) in the time axis. The time index of the synchronization signal block is included in the synchronization signal block and notified to the terminal device 200. The terminal device 200 is able to recognize a downlink transmission beam of the base station device 100 in the synchronization signal block, radio frame and/or subframe boundaries in the synchronization signal block by the time index of the synchronization signal block. Further, the terminal device 200 is able to identify the index of the synchronization signal block by the time index.

Examples of synchronization signal block time index notifications include notifications by NR-PBCH-DMRS time index.

Examples of synchronization signal block time-index notifications include notifications by information included in NR-MIB.

[System Information According to Present Embodiment]

System information is information for informing a setting in a cell that transmits the system information. The system information includes, for example, information related to access to the cell, information related to cell selection, information related to another RAT and another system, and the like.

It is possible to classify the system information into MIB and SIB. MIB is information of a fixed payload-size broadcast by PBCH. MIB includes information for acquiring SIB. The SIB is system information other than MIB. SIB is broadcast by PDSCH.

Further, it is possible to classify the system information into first system information, second system information, and third system information. The first system information and the second system information include information related to access to the cell, information related to acquisition of other system information, and information related to cell selection. In LTE, it is possible to regard information included in MIB as the first system information, and information included in SIB1 and the SIB2 as the second system information. If the terminal device 200 is unable to acquire all of the first system information and the second system information from the cell, it is assumed that accessing the cell is prohibited.

MIB is information of a physical layer necessary for receiving system information, and includes a downlink system bandwidth, a part of a system frame number, scheduling information of SIB, and the like.

SIB1 is scheduling information of system information other than the access control information and SIB1 of the cell, and includes access information of the cell, cell selection information, the maximum uplink transmission power information, TDD setting information, cycle of the system information, mapping information of the system information, a length of an SI window, and the like.

SIB2 includes connection prohibition information, common radio resource setting information (radioResourceConfigCommon), uplink carrier information, and the like. The cell-common radio resource setting information includes cell-common PRACH and RACH setting information. The terminal device 200 performs random access procedure on the basis of the PRACH and RACH setting information at the time of the initial access.

[System Information of NR According to Present Embodiment]

Also in NR, the system information is broadcast from the NR cell.

A physical channel carrying the system-information may be transmitted in a slot or a mini-slot. The mini-slot is defined by the number of symbols smaller than the number of symbols of the slot. By transmitting the physical channel carrying the system information in the mini-slot, it is possible to decrease the time necessary for beam sweeping and to reduce the overhead.

The first system information is transmitted in NR-PBCH, and the second system information is transmitted in a physical channel different from NR-PBCH.

[RACH Procedure According to Present Embodiment]

The RACH procedure is performed in order to achieve the following purposes: RRC connection setup from the idle state to the inactive state or the connected state; request for state transition from the inactive state to the connected state; handover for switching connection cells, scheduling request for resource request for uplink data transmission, timing advance adjustment for adjusting uplink synchronization, on-demand SI request for non-transmitted system information, beam recovery, and the like.

The RRC connection setup from the idle state to the inactive state or the connected state is an operation performed when the terminal device 200 is connected to the base station device 100 in response to the generation of traffic or the like. Specifically, the RRC connection setup from the idle state to the inactive state or the connected state is an operation of passing the information related to connection (e.g., UE context) from the base station device 100 to the terminal device 200. The UE context is managed by identification information (e.g., C-RNTI) of a predetermined terminal device 200 designated by the base station. When the terminal device 200 finishes the operation, the state transitions from the idle state to the inactive state, or from the idle state to the connected state.

The request for the state transition from the inactive state to the connected state is an operation of requesting the state transition from the inactive state to the connected state in response to the generation of traffic or the like. The transition to the connected state makes it possible for the terminal device 200 to transmit and receive unicast data to and from the base station device 100.

A handover for switching a connected cell is an operation of switching a connection from a cell (serving) connected to a cell (neighbor cell) neighboring to the cell due to a change in radio wave environments such as a shift of the terminal device 200. The terminal device 200 that has received the handover command from the base station device 100 performs a connection request to the neighbor cell specified by the handover command.

The scheduling request is an operation of making a resource request for uplink data transmission in response to the generation of traffic or the like. After normally receiving the scheduling request, the base station device 100 allocates a resource of PUSCH to the terminal device 200. It is to be noted that the scheduling request is also performed by PUCCH.

Timing advance adjustment for adjusting uplink synchronization is an operation for adjusting errors of downlink and uplink frames caused by propagation delay. The terminal device 200 transmits PRACH at a time adjusted for the downlink frame. This allows the base station device 100 to recognize the propagation delay with the terminal device 200, and to notify the value of the timing advance to the terminal device 200 using Message 2 or the like.

An on-demand SI request requesting non-transmitted system information is an operation that requests the base station device 100 to transmit system information when the non-transmitted system information for purposes such as overhead of the system information is necessary for the terminal device 200.

The beam recovery is an operation for requesting a return when the communication quality is degraded due to the movement of the terminal device 200 or the blocking of the communication path by other objects after the beam is established. The base station device 100 that has received the request attempts to connect to the terminal device 200 using different beams.

The RACH procedure further includes a contention-based RACH procedure and a contention-free RACH procedure.

Figure 10:
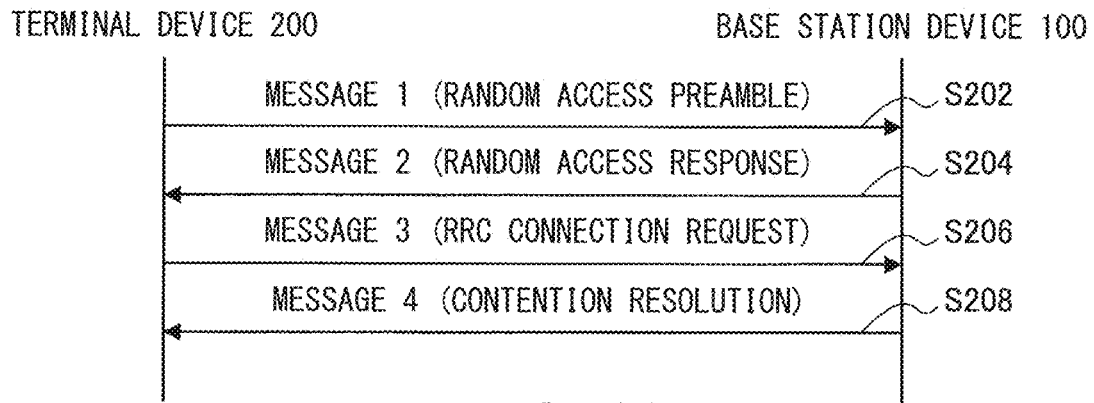
FIG. 10 is a sequence diagram illustrating an example of a flow of a contention-based RACH procedure according to the embodiment.

FIG. 10 is a sequence diagram illustrating an example of a flow of the contention-based RACH procedure according to the present embodiment. As illustrated in FIG. 10, first, the terminal device 200 transmits a random access preamble, also referred to as Message 1, to the base station device 100 (step S202). The base station device 100 then transmits a random access response, also referred to as Message 2, to the terminal device 200 (step S204). The terminal device 200 then transmits the RRC message of the RRC connection request, also referred to as Message 3, to the base station device 100 (step S206). The base station device 100 then transmits Contention resolution, also referred to as Message 4, to the terminal device 200 (step S208).

The contention-based RACH procedure illustrated in FIG. 10 is a RACH procedure performed under the initiative of the terminal device 200. The contention-based RACH procedure is a four-step procedure starting with the transmission of Message 1 from the terminal device 200. The terminal device 200 selects from a plurality of preset RACH resources and a plurality of preset PRACH preambles, and transmits PRACH. Since the plurality of RACH resources and the plurality of PRACH preambles are shared with another terminal device 200, the PRACH may be contended.

Figure 11:
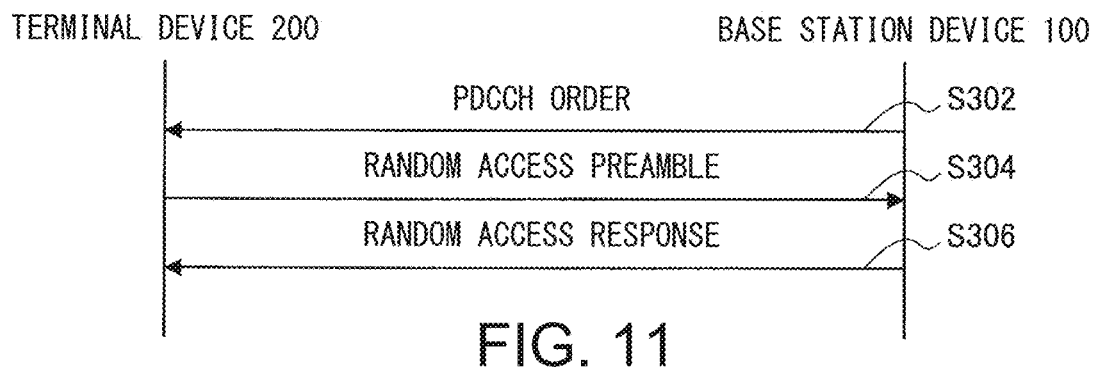
FIG. 11 is a sequence diagram illustrating an example of a flow of a contention-free RACH procedure according to the embodiment.

FIG. 11 is a sequence diagram illustrating an example of a flow of a contention-free RACH procedure according to the present embodiment. As illustrated in FIG. 11, first, the base station device 100 transmits a PDCCH order to the terminal device 200 (step S302). The terminal device 200 then transmits a random access preamble to the base station device 100 (step S304). The base station device 100 then transmits a random access response to the terminal device 200 (step S306).

The contention-free RACH procedure illustrated in FIG. 11 is a RACH procedure performed under the initiative of a base station. The contention-free RACH procedure is a procedure of three steps in total, starting with transmitting a PDCCH order from the base station device 100. The terminal device 200 transmits the random access preamble using PRACH indicated in the PDCCH order. The base station device 100 schedules the random access preamble, and this makes it difficult to cause the contention of the PRACH to occur.

[Details of PRACH of NR According to Present Embodiment]

NR-PRACH is configured by using a Zadoff-Chu sequence or an M sequence. In NR-PRACH, a plurality of preamble formats is defined. The preamble format is defined by a combination of parameters such as a PRACH subcarrier interval, a transmission bandwidth, a sequence length, the number of symbols used for transmission, the number of transmission repetitions, a CP length, and a guard period length. It is to be noted that the preamble format may specify the type of the sequence (Zaddoff-Chu sequence or M sequence) used to transmit NR-PRACH.

For the terminal device 200 in the idle mode, a setting related to NR-PRACH is made by the system information. In addition, for the terminal device 200 in the connected mode, a setting related to NR-PRACH is made by the dedicated RRC signaling.

NR-PRACH is transmitted by a physical resource (NR-PRACH occasion) that is able to transmit NR-PRACH. The physical resource is designated by the setting related to NR-PRACH. The terminal device 200 selects any of the physical resources and transmits NR-PRACH. In addition, the terminal device 200 in the connected mode transmits NR-PRACH using the NR-PRACH resource. The NR-PRACH resource is a combination of the NR-PRACH preamble and the physical resource thereof. The base station device 100 may designate the NR-PRACH resource to the terminal device 200.

The type of sequence of the preamble of NR-PRACH is numbered. The number of the type of the sequence of the preamble is referred to as preamble index.

NR-PRACH is retransmitted when the random access procedure is unsuccessful. When retransmitting, the terminal device 200 waits for NR-PRACH to be transmitted for a wait period calculated from a backoff value (backoff indicator, BI). It is to be noted that the backoff values may differ depending on terminal categories of the terminal device 200 and priorities of traffics generated. At this time, a plurality of backoff values are notified, and the terminal device 200 selects a backoff value to be used according to the priorities. When retransmitting NR-PRACH, the transmission power of NR-PRACH is increased compared with the initial transmission (this procedure is referred to as power ramping).

[Details of Random Access Response of NR According to Present Embodiment]

The random access response of NR is transmitted by NR-PDSCH.

NR-PDSCH containing the random access response is scheduled by NR-PDCCH whose CRC is scrambled by RA-RNTI. The NR-PDCCH is transmitted in a common control sub-band. The NR-PDCCH is located in a CSS (common search space). It is to be noted that the value of the RA-RNTI is determined on the basis of a transmission resource (time resource (slot or subframe) and a frequency resource (resource block)) of NR-PRACH corresponding to the random access response. It is to be noted that the NR-PDCCH may be located in a search space corresponding to NR-PRACH linked to the random access response. Specifically, the search space in which the NR-PDCCH is located is set in association with the physical resource in which the preamble of NR-PRACH and/or NR-PRACH has been transmitted. The search space in which the NR-PDCCH is located is set in association with the preamble index and/or the index of the physical resource.

The NR-PDCCH is NR-SS and QCL.

The random access response of NR is information of MAC. The random access response of NR includes at least an uplink grant for transmitting Message 3 of NR, a value of a timing advance used for adjusting uplink frame synchronization, and a value of a temporary C-RNTI. Further, the random access response of NR includes a PRACH index used to transmit the NR-PRACH corresponding to the random access response. Further, the random access response of NR includes information related to backoff used for waiting for PRACH to be transmitted. The base station device 100 includes those pieces of information and transmits the information by NR-PDSCH. The terminal device 200 determines whether or not the random access preamble is successfully transmitted from those pieces of information. When it is determined from this information that the transmission of the random access preamble has been unsuccessful, the terminal device 200 performs the transmission process of Message 3 of NR in accordance with the information included in the random access response. On the other hand, when it is determined that the transmission of the random access preamble has been unsuccessful, the terminal device 200 determines that the random access procedure has been unsuccessful, and performs a NR-PRACH retransmission process.

It is to be noted that the random access response of NR may include a plurality of uplink grants for transmitting Message 3 of NR. The terminal device 200 may select one of the resources to transmit Message 3 from the plurality of uplink grants. As a result, it is possible to alleviate the contention of transmission of Message 3 of NR when random access response of the same NR is received at different terminal devices 200, and it is possible to provide a more stable random access procedure.

[Details of Message 3 of NR according to Present Embodiment]

Message 3 of NR is transmitted by NR-PUSCH. The NR-PUSCH is transmitted using the resource designated by the random access response.

Message 3 of NR includes an RRC connection request message.

A waveform of NR-PUSCH transmitted including Message 3 of NR is designated by a parameter included in the system information. Specifically, OFDM or DFT-s-OFDM is determined by the parameter designation.

When Message 3 of NR is normally received, the base station device 100 shifts to a contention resolution transmitting process. In contrast, if the base station device 100 is unsuccessful in receiving Message 3 of NR, the base station device 100 is able to attempt to receive Message 3 of NR again for at least a predetermined period.

As a specific example of the process after Message 3 of NR is not normally received, the base station device 100 designates retransmission of Message 3 to the terminal device 200. The base station device 100 transmits a designation to retransmit Message 3 by using the downlink resource after a predetermined number of slots (or subframes, radio frames) from the resource designated to transmit Message 3.

Example of the designation of retransmission of Message 3 and the transmission resource includes designation by retransmission of the random access response.

NR-PDSCH containing the random access response to be retransmitted is scheduled by NR-PDCCH whose CRC has been scrambled by RA-RNTI. The value of RA-RNTI is the same value as the value of RA-RNTI used in the initial transmission. That is, the RA-RNTI value is determined on the basis of a transmission resource of NR-PRACH corresponding to the random access response. Alternatively, the value of RA-RNTI may be determined on the basis of information identifying the initial transmission and the retransmission in addition to the transmission resource of NR-PRACH. The NR-PDCCH is located in CSS (common search space).

Alternatively, NR-PDSCH containing the random access response to be retransmitted is scheduled by NR-PDCCH whose CRC is scrambled by the temporary C-RNTI or C-RNTI included in the random access response transmitted in the initial transmission.

Another example of the designation of retransmission of Message 3 and the transmission resource includes designation by NR-PDCCH used for designation of retransmission of Message 3. The NR-PDCCH is an uplink grant. DCI of the NR-PDCCH designates a resource for the retransmission of Message 3. The terminal device 200 retransmits Message 3 on the basis of the designation of the uplink grant.

As a specific example of the process after Message 3 of NR is not normally received, the base station device 100 attempts to receive Message 3 in a retransmission resource designated in advance.

If no Contention resolution is transmitted from the base station device 100 after transmitting Message 3 within a predetermined period, the terminal device 200 transmits NR-PUSCH including Message 3 using the retransmission resource designated in advance.

Alternatively, in a case where the terminal device 200 receives NACK with respect to Message 3, the terminal device 200 transmits NR-PUSCH including Message 3 by using the retransmission resource designated in advance corresponding to the NACK.

The retransmission resource to be designated in advance is included in the system information or the random access response, for example.

It is to be noted that in a case where the number of retransmissions of Message 3 of NR exceeds a predetermined number of times, or in a case where the reception of the Contention resolution of NR is unsuccessful within a predetermined period, the terminal device 200 determines that the random access procedure has been unsuccessful, and performs the NR-PRACH retransmission process.

It is to be noted that a transmission beam of the terminal device 200 used for retransmission of Message 3 of NR may be different from the transmission beam of the terminal device 200 used for the initial transmission of Message 3.

It is to be noted that, in a case where the neither Contention resolution of NR nor Message 3 retransmission designation are not received within the predetermined period, the terminal device 200 determines that the random access procedure has been unsuccessful and performs the NR-PRACH retransmission process. The predetermined period is set by, for example, system information.

[Details of Contention Resolution of NR According to Present Embodiment]

Contention resolution of NR is transmitted by NR-PDSCH.

NR-PDSCH containing Contention resolution is scheduled by NR-PDCCH whose CRC is scrambled by the temporary C-RNTI or C-RNTI. The NR-PDCCH is transmitted in the common control sub-band. The NR-PDCCH is located in USS (terminal-specific search space). It is to be noted that the NR-PDCCH may be located in CSS.

In a case where the terminal device 200 successfully receives NR-PDSCH containing Contention resolution, the terminal device 200 transmits as a response ACK to the base station device 100. Thereafter, the random access procedure is considered to be successful, and the terminal device 200 becomes the connected state. In contrast, in the case where NACK to NR-PDSCH containing Contention resolution is received from the terminal device 200, or in a case where there is no response, the base station device 100 retransmits NR-PDSCH containing Contention resolution. Further, in a case where Contention resolution of NR is not received within the predetermined period, the terminal device 200 determines that the random access procedure has been unsuccessful, and performs the NR-PRACH retransmission process.

2. TECHNICAL ISSUES

NR is an access technology that is able to handle various use cases including eMBB, mMTC, and URLLC. In any of these use cases, it is desirable to reduce the latency of the RACH procedure.

First, eMBB is described. For eMBB, a beam adjustment procedure is introduced into the RACH procedure. Therefore, the RACH procedure performed in eMBB has an increased latency as compared with the RACH procedure where the beam adjustment is not performed. It is therefore desirable to reduce the latency of the RACH procedure performed in the eMBB.

Next, URLLC is described. In URLLC, not only information of a user plane but also information of a control plane is desired to have lower delay and higher reliability as compared with the eMBB. It is therefore desirable to reduce the latency of the RACH procedure performed in the URLLC.

Next, mMTC is described. In mMTC, a large number of terminal devices 200 perform communication by sharing narrowband resources. The contention probability of RACH is therefore increased. The longer the latency, the more likely that the contention occurs, and it becomes difficult to complete the RACH procedure. It is therefore desirable to reduce the latency of the RACH procedure performed in mMTC.

As described above, it is desirable to reduce the latency of the RACH procedure in all eMBB, mMTC, and URLLC use cases.

Two-step RACH procedure has been proposed as a RACH procedure having a latency smaller than that of four-step RACH procedure. However, the two-step RACH procedure may be less stable because the two-step RACH procedure completes the procedure with fewer steps.

Accordingly, the present embodiment proposes a mechanism that is able to achieve the stability the RACH procedure and the reduction in the latency of the RACH procedure by using the four-step RACH procedure and the two-step RACH procedure together while flexibly switching therebetween.

3. TECHNICAL FEATURES

[Functional Configuration]

Hereinafter, referring to FIGS. 12 and 13, examples of functional configurations of the base station device 100 and the terminal device 200 will be described.

(1) Functional Configuration of Base Station Device 100

Figure 12:
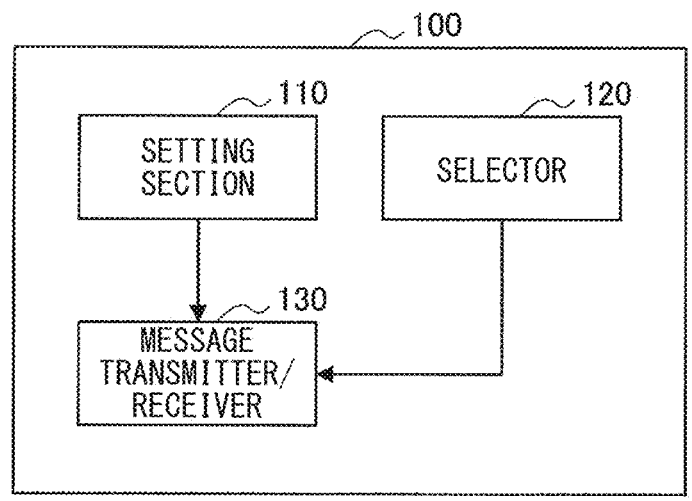
FIG. 12 is a diagram for explaining an example of a functional configuration of the base station device according to the embodiment.

FIG. 12 is a diagram for explaining an example of a functional configuration of the base station device 100 according to the present embodiment. As illustrated in FIG. 12, the base station device 100 includes a setting section 110, a selector 120, and a message transmitter/receiver 130. The functions illustrated in FIG. 12 may be implemented in any component such as the higher layer processor 101 or the controller 103 illustrated in FIG. 5.

The setting section 110 has a function of performing various settings on the terminal device 200. For example, the setting section 110 sets a reference for switching between two-step RACH procedure and the four-step RACH procedure in the terminal device 200. In other words, the setting section 110 sets a selection reference of whether to transmit the uplink message of the two-step RACH procedure or the uplink message of the four-step RACH procedure in the terminal device 200. In addition, the setting section 110 sets the selection reference for the uplink message format selection of the RACH procedure in the terminal device 200. The setting section 110 generates setting information including the selection reference.

The selector 120 has a function of selecting whether to transmit a message of the two-step RACH procedure or a message of the four-step RACH procedure. That is, the switching between the two-step RACH procedure and the four-step RACH procedure may be base station device 100-led.

The message transmitter/receiver 130 has a function of transmitting and receiving various messages to and from the terminal device 200. For example, the message transmitter/receiver 130 transmits and receives RACH procedure messages. Further, the message transmitter/receiver 130 transmits the setting information generated by the setting section 110 to the terminal device 200.

(2) Functional Configuration of Terminal Device 200

Figure 13:
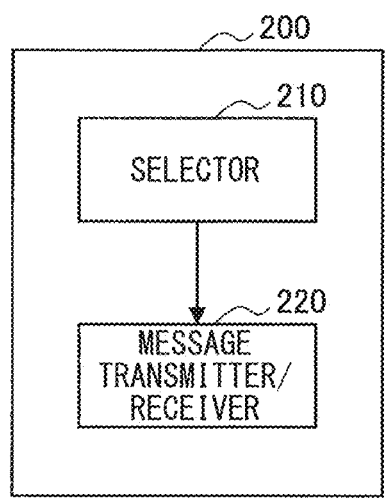
FIG. 13 is a diagram for explaining an example of a functional configuration of the terminal device according to the embodiment.

FIG. 13 is a diagram for explaining an example of a functional configuration of the terminal device 200 according to the present embodiment. As illustrated in FIG. 13, the terminal device 200 includes a selector 210 and a message transmitter/receiver 220. The functions illustrated in FIG. 13 may be implemented in any component such as the higher layer processor 201 or the controller 203 illustrated in FIG. 6.

The selector 210 has a function of performing various selections on the basis of a selection reference set from the base station device 100. For example, the selector 210 selects whether to transmit the uplink message of the two-step RACH procedure or the uplink message of the four-step RACH procedure. That is, the switching between the two-step RACH procedure and the four-step RACH procedure may be terminal device 200-led. Further, the selector 210 also selects the uplink message format of the RACH procedure.

The message transmitter/receiver 220 has a function of transmitting and receiving various messages to and from the base station device 100. For example, the message transmitter/receiver 220 transmits and receives messages for RACH procedure. Further, the message transmitter/receiver 220 receives setting information from the base station device 100.

Examples of the functional configurations of the base station device 100 and the terminal device 200 have been described above.

In the present embodiment,

Message 1 of the two-step RACH procedure, which is the uplink message of the two-step RACH procedure, corresponds to a first uplink message.

Message 2 of the two-step RACH procedure, which is the downlink message of the two-step RACH procedure, corresponds to a first downlink message.

Further, Message 1 and Message 3 of the four-step RACH procedure, which are the uplink messages of the four-step RACH procedure, each correspond to a second uplink message.

Message 2 and Message 4 of the four-step RACH procedure, which are the downlink messages of the four-step RACH procedure, each correspond to a second downlink message.

[Details of Two-Step RACH Procedure According to Present Embodiment]

The two-step RACH procedure according to the present embodiment will be described. The two-step RACH procedure is a RAHC procedure in which the process is completed by exchange of two messages.

In the two-step RACH procedure, a step in which the terminal device 200 performs uplink transmission to the base station device 100 is defined as a first step (i.e., step 1 of the two-step RACH procedure). The message transmitted on the uplink in the first step is also referred to as Message 1. The uplink message of the two-step RACH procedure and the uplink message of the four-step RACH procedure typically differ from each other.

For example, information included in the uplink message of the two-step RACH procedure may be different from information included in the uplink message of the four-step RACH procedure. The base station device 100 may identify whether the received message is the uplink message of the two-step RACH procedure or the uplink message of the four-step RACH procedure on the basis of the contents of the received uplink message.

Also, a format of the uplink message of the two-step RACH procedure may be different from a format of the uplink message of the four-step RACH procedure. The base station device 100 may identify whether the received message is the uplink message of the two-step RACH procedure or the uplink message of the four-step RACH procedure on the basis of the format of the received uplink message.

In the two-step RACH procedure, a step of performing downlink transmission from the base station device 100 to the terminal device 200 as a response to the uplink transmission in the first step is defined as a second step (i.e., step 2 of the two-step RACH procedure). The message transmitted on the downlink in the second step is also referred to as Message 2. The downlink message of the two-step RACH procedure typically has a content and/or a format that differs from the downlink message of the four-step RACH procedure.

For example, information included in the downlink message of the two-step RACH procedure may be different from information included in the downlink message of the four-step RACH procedure. The terminal device 200 may identify whether the received message is the downlink message of the two-step RACH procedure or the downlink message of the four-step RACH procedure on the basis of the contents of the received downlink message.

Also, a format of the downlink message of the two-step RACH procedure and a format of the downlink message of the four-step RACH procedure may be different from each other. The terminal device 200 may identify whether the received message is the downlink message of the two-step RACH procedure or the downlink message of the four-step RACH procedure on the basis of the format of the received downlink message.

Hereinafter, the contents and the formats of Message 1 and Message 2 of the two-step RACH procedure and the flow of the two-step RACH procedure will be described in detail. In the following, Message 1 is Message 1 of the two-step RACH procedure and Message 2 is Message 2 of the two-step RACH procedure, unless otherwise stated.

(1) Message 1 of Two-Step RACH Procedure According to Present Embodiment (1.1) Contents Message 1 of the two-step RACH procedure may be messages containing both the Message 1 and Message 3 of the four-step RACH procedure. Message 1 of the two-step RACH procedure may also include identification information of the terminal device 200.

(1.2) Format

Message 1 may have a variety of formats.

PRACH+PUSCH

For example, the format of Message 1 may be a combination of PRACH and PUSCH. That is, Message 1 may be transmitted using PRACH and PUSCH. The identification information of the terminal device 200 is represented by a UE-ID field and/or a PRACH preamble and/or a RACH resource included in PUSCH.

PUSCH

For example, the format of Message 1 may be PUSCH. That is, Message 1 may be transmitted using PUSCH only. The identification information of the terminal device 200 is represented by a UE-ID field and/or a RACH resource included in PUSCH.

PRACH

For example, the format of Message 1 may be PRACH. That is, Message 1 may be transmitted using PRACH only. The identification information of the terminal device 200 is represented by a PRACH preamble and/or a RACH resource.

(1.3) Repeated Transmission

The terminal device 200 may repeatedly transmit Message 1 until the terminal device 200 receives Message 2. In that case, the terminal device 200 may repeatedly transmit Message 1 using both PRACH and PUSCH. Further, the terminal device 200 may first transmit Message 1 using PRACH, and then repeatedly transmit Message 1 using PUSCH. In any case, by repeatedly transmitting Message 1, it is possible to improve the reception reliability of Message 1 in the base station device 100.

(1.4) NOMA (Non-Orthogonal Multiple Access) Transmission

PUSCH transmitted by Message 1 may be non-orthogonally multiplexed. Non-orthogonal multiplexing is a multiplexing scheme in which some of or all of physical resources (frequency resources and time resources) used in physical channels of a plurality of terminal devices 200 are overlapped. The PUSCH may be multiplied by a predetermined interleave code or a spreading code, for example. Alternatively, the PUSCH may be repeatedly transmitted on a bit-level basis. The base station device 100 may decode a plurality of physical channels using the same physical resource by performing a decoding process of non-orthogonal multiplexing.

(1.5) Resource of Message 1

The resources to which Message 1 of the two-step RACH procedure may be transmitted (the occasions of Message 1 of the two-step RACH procedure) is designated by the base station device 100. The terminal device 200 transmits Message 1 using some or all of the designated resources.

PRACH of Message 1 of the two-step RACH procedure and PRACH of the four-step RACH procedure are set by the base station device 100 such that at least one of the physical resource (frequency resource and time resource) and the PRACH preamble differs.

An example of setting of the occasion of Message 1 will be described.

The occasion of Message 1 of the two-step RACH procedure is not superimposed on the PRACH occasion. The settings of the Message 1 occasion and the PRACH occasion are independent.

An example of setting of the occasion of Message 1 will be described.

The PRACH transmittable resources among the Message 1 occasions of the two-step RACH procedure are shared with the PRACH occasions. In this case, it is preferable that a set of PRACH preambles that is able to be used in the two-step RACH procedure and a set of PRACH preambles that is able to be used in the four-step RACH procedure be independent. It is preferable that neither PRACH preamble be included in both the set of PRACH preambles of the two-step RACH procedure and the set of PRACH preambles of the four-step RACH procedure.

(2) Message 2 of Two-Step RACH Procedure According to Present Embodiment (2.1) Contents Message 2 of the two-step RACH procedure may be messages containing both Message 2 and Message 4 of the four-step RACH procedure. Message 1 of the two-step RACH procedure may be response information associated with identification information of the terminal device 200.

(2.2) Format

Message 2 may have a variety of formats. It is preferred that Message 2 be transmitted in PDSCH scheduled in PDCCH.

RA-RNTI

PDCCH for scheduling transmissions of Message 2 may be transmitted in association with RA-RNTI. For example, CRC of PDCCH scheduling transmissions of Message 2 may be scrambled using RA-RNTI and transmitted.

It is to be noted that RA-RNTI used in the two-step RACH procedure may be RA-RNTI other than RA-RNTI used in the four-step RACH procedure. For example, RA-RNTI used in the two-step RACH procedure may be calculated to include a predetermined offset value for RA-RNTI used in the four-step RACH procedure. The terminal device 200 is able to recognize from the RA-RNTI difference whether the response from the base station device 100 is a four-step RACH or a two-step RACH response.

C-RNTI

PDCCH for scheduling transmissions of Message 2 may be transmitted in association with C-RNTI. For example, CRC of PDCCH scheduling transmissions of Message 2 may be scrambled using C-RNTI and transmitted.

It is to be noted that C-RNTI is preset by the base station device 100.

Identifiers of Terminal Device 200 Other than C-RNTI

PDCCH for scheduling transmissions of Message 2 may be transmitted in association with an identifier of terminal device 200 other than C-RNTI. Such an identifier may be, for example, a unique identification number, S-TMSI, or the like assigned to SIM (Subscriber Identity Module).

(3) Flow of Process

Figure 14:
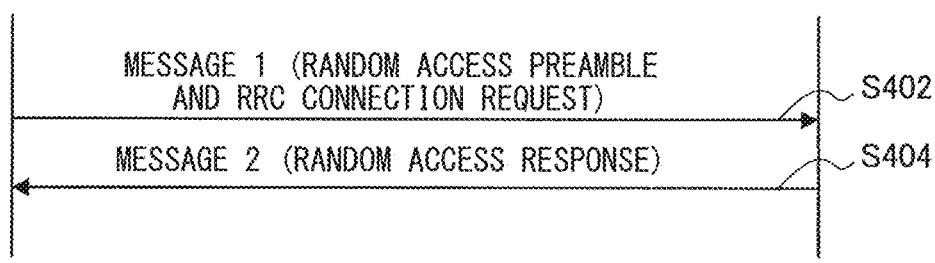
FIG. 14 is a sequence diagram illustrating an example of a flow of a two-step RACH procedure according to the embodiment.

FIG. 14 is a sequence diagram illustrating an example of a flow of the two-step RACH procedure according to the present embodiment. As illustrated in FIG. 14, the terminal device 200 transmits Message 1 of the two-step RACH procedure to the base station device 100 (step S402). Message 1 includes, for example, a random access preamble and the RRC message of the RRC connection request. Subsequently, the base station device 100 transmits Message 2 of the two-step RACH procedure to the terminal device 200 (step S404). Message 2 includes, for example, the random access response.

According to the two-step RACH procedure illustrated in FIG. 14, since the number of steps (i.e., the number of messages) is reduced from four steps to two steps as compared with the four-step RACH procedure illustrated in FIG. 10, it is possible to reduce the latency of the entire RACH procedure.

The two-step RACH procedure is particularly useful in the unlicensed band. More specifically, in a case where the four-step RACH procedure is performed in the unlicensed band, channel accesses are performed four times. In contrast, in a case where the two-step RACH procedure is performed in the unlicensed band, only two channel accesses are performed. In this manner, by performing the two-step RACH procedure, it is possible to reduce the frequency of channel accesses in the unlicensed band as compared with the four-step RACH procedure.

[Switching Between RACH Procedures]

The base station device 100 and terminal device 200 according to the present embodiment perform switching between the two-step RACH procedure and the four-step RACH procedure.

In detail, the terminal device 200 (e.g., selector 210) selects in the RACH procedure whether to transmit the uplink message of the two-step RACH procedure or the uplink message of the four-step RACH procedure to the base station device 100. That is, the terminal device 200 selects whether to execute the two-step RACH procedure or the four-step RACH procedure.

Further, the base station device 100 (e.g., setting section 110) sets a selection reference (corresponding to a first selection reference) in the terminal device 200 for the terminal device 200 to select whether to transmit the uplink message of the two-step RACH procedure or the uplink message of the four-step RACH procedure in the RACH procedure. The base station device 100 sets the first selection reference in the terminal device 200 that supports both the two-step RACH procedure and the four-step RACH procedure. The terminal device 200 selects, on the basis of the first selection reference set by the base station device 100, whether to transmit the uplink message of the two-step RACH procedure or the uplink message of the four-step RACH procedure.

The two-step RACH procedure has a smaller latency as compared with the four-step RACH procedure, but lacks a stability due to the effect that the contention resolution is not enough, or the like. In contrast, the four-step RACH procedure has enough stability, but has a high latency. The terminal device 200 is able to reduce the latency of the RACH procedure and maintain the stability of the RACH procedure by using the two-step RACH procedure and the four-step RACH procedure while flexibly switching between the two-step RACH procedure and the four-step RACH procedure according to a predetermined selection reference.

Hereinafter, an example of the selection reference will be described.

(1) Uses

The terminal device 200 may select whether to transmit the uplink message of the two-step RACH procedure or the uplink message of the four-step RACH procedure to the base station device 100, depending on a use to which the RACH procedure is applied.

Uses for which the two-step RACH procedure is to be executed include connection setup from the inactive mode to the connected mode, handovers using common RACH resources, scheduling requests, on-demand SI requests, beam recovery, and the like. In a case where the RACH procedure is executed for those uses, the terminal device 200 executes the two-step RACH procedure by transmitting the uplink message of the two-step RACH procedure to the base station device 100.

Uses for which the four-step RACH procedure is to be executed include connection setup from the idle mode to RRC connection, the timing advance adjustment, and the like. In a case where RACH procedure is executed for those uses, the terminal device 200 executes the four-step RACH procedure by transmitting the uplink message of the four-step RACH procedure to the base station device 100.

(2) RRC State

The terminal device 200 may select whether to transmit the uplink message of the two-step RACH procedure or the uplink message of the four-step RACH procedure to the base station device 100, depending on an RRC state of the terminal device 200.

For example, in the case where the RRC state of the terminal device 200 is the idle mode, the terminal device 200 selects the uplink message of the four-step RACH procedure as a message to be transmitted to the base station device 100. Specifically, the terminal device 200 executes the four-step RACH procedure when the RRC state transitions from the idle mode to the inactive mode or the connected mode. In other words, the terminal device 200 that does not have RRC information executes the four-step RACH procedure.

For example, the terminal device 200 selects the uplink message of the two-step RACH procedure as a message to be transmitted to the base station device 100 in a case where the RRC-state of the terminal device 200 is in the inactive mode or the connected mode. Specifically, the terminal device 200 executes the two-step RACH procedure when the RRC state transitions from the inactive mode to the connected mode. In other words, the terminal device 200 that has the RRC information executes the two-step RACH procedure.

(3) Fallback

The terminal device 200 first executes the two-step RACH procedure and, if the two-step RACH procedure is unsuccessful, executes the four-step RACH procedure. That is, the terminal device 200 first selects the uplink message of the two-step RACH procedure and, if the two-step RACH procedure is unsuccessful, selects the uplink message of the four-step RACH procedure as a message to be transmitted to the base station device 100. Such switching of the RACH procedure to the four-step RACH procedure after once executing the two-step RACH procedure is also referred to as fallback.

The success/unsuccess of the two-step RACH procedure may be recognized by the terminal device 200. For example, the terminal device 200 recognizes, as a success of the two-step RACH procedure, reception of the downlink message of the two-step RACH procedure corresponding to the uplink message of the two-step RACH procedure from the base station device 100. In contrast, the terminal device 200 recognizes, as an unsuccess of the two-step RACH procedure, no reception of the downlink message of the two-step RACH procedure corresponding to the uplink message of the two-step RACH procedure from the base station device 100. That is, the terminal device 200 recognizes that the two-step RACH procedure is successful if Message 2 of the two-step RACH procedure corresponding to Message 1 of the two-step RACH procedure is received, and recognizes that the two-step RACH procedure is unsuccessful if Message 2 of the two-step RACH procedure corresponding to Message 1 of the two-step RACH procedure is not received. If the terminal device 200 recognizes that the two-step RACH procedure is unsuccessful, the terminal device 200 executes the fallback to the four-step RACH procedure.

The terminal device 200 may retransmit the uplink message of the two-step RACH procedure until the two-step RACH procedure is successful. In that case, if the two-step RACH procedure is unsuccessful even if the number of uplink message transmissions of the two-step RACH procedure exceeds a predetermined threshold, the terminal device 200 selects the uplink message of the four-step RACH procedure as a message to be transmitted to the base station device 100. The number of times of uplink message transmissions of the two-step RACH procedure may be counted by a counter for counting random access failures. As the counter for counting random access failures, a counter for the four-step RACH procedure and a count for the two-step RACH procedure may be set from the networks.

The success/unsuccess of the two-step RACH procedure may be recognized by the base station device 100. The base station device 100 recognizes that successful reception of all of the uplink messages of the two-step RACH procedure as a success of the two-step RACH procedure. The base station device 100 recognizes that successful reception of a part of the uplink message of the two-step RACH procedure as an unsuccess of the two-step RACH procedure. It is to be noted that a part of the uplink message of the two-step RACH procedure may be, for example, PRACH. Further, a part of the uplink message of the two-step RACH procedure may be, for example, DMRS of PUSCH.

The base station device 100 executes the fallback to the four-step RACH procedure if the base station device 100 recognizes that the two-step RACH procedure is unsuccessful. In that case, the base station device 100 transmits to the terminal device 200 information that designates switching to the four-step RACH procedure. The information designating the switching to the four-step RACH procedure may be Message 2 of the four-step RACH procedure or other messages. Then, the terminal device 200 recognizes that reception of the information designating the switching to the four-step RACH procedure from the base station device 100 as that the two-step RACH procedure is unsuccessful, and executes the fallback to the four-step RACH procedure. For example, the terminal device 200 transmits Message 1 or Message 3 of the four-step RACH procedure to the base station device 100.

As an example of the information designating the switching to the RACH procedure, there is given RNTI information. The terminal device 200 recognizes that it is the two-step RACH procedure if RNTI corresponding to the two-step RACH procedure is used, and recognizes that it is the four-step RACH procedure if RNTI corresponding to the four-step RACH procedure is used.

As an example of the information designating the switching to the RACH procedure, there is given a search space. The terminal device 200 recognizes that it is the two-step RACH procedure if the search space corresponding to the two-step RACH procedure is used, and recognizes that it is the four-step RACH procedure if the search space corresponding to the four-step RACH procedure is used.

In the case where the fallback is performed, it is preferable that the count of the number of transmissions used for power ramping be not reset. Also, it is preferable that the count of the number of times of beam switching be not reset when the fallback is performed.

(4) Cell

The terminal device 200 may select whether to transmit the uplink message of the two-step RACH procedure or the uplink message of the four-step RACH procedure to the base station device 100 on the basis of a cell in which the RACH procedure is performed.

PCell (Primary Cell) and/or PSCell (Primary Secondary Cell) are each/is also referred to as anchor carrier, and serve for transmission of control information such as system information, mobility management, radio link management, and the like. The stability of connection is therefore desired in the PCell and/or in the PSCell. In contrast, SCell (Secondary Cell) serves as a traffic offload and the like. Therefore, the latency reduction and the resource overhead reduction are more important than the stability of connection.

The terminal device 200 thus selects the uplink message of the four-step RACH procedure as a message to be transmitted to the base station device 100 when the RACH procedure is performed in the PCell and/or the PSCell. As a result, it is possible to realize the stability of connection. In contrast, the terminal device 200 selects the uplink message of the two-step RACH procedure as a message to be transmitted to the base station device 100 when the RACH procedure is performed in the PSCell or the SCell. As a result, it is possible to realize the latency reduction and the resource overhead reduction. In this way, it is possible to satisfy the requirements in both cases: when the connection stability is desired; and when the latency reduction and the resource overhead reduction are desired rather than the connection stability.

The contention-free RACH procedure may be executed in a case where the RACH procedure is performed in the PCell, the PSCell and/or the SCell.

The above-mentioned PCell and PSCell may be replaced with an initial active bandwidth, and the SCell may be replaced with a bandwidth other than the initial active bandwidth. Similar effects are exhibited when the terms are replaced.

[Switching of Formats]

The base station device 100 and the terminal device 200 according to the present embodiment switch the format of a message of the two-step RACH procedure.

In detail, the terminal device 200 (e.g., selector 210) selects a format of the uplink message of the two-step RACH procedure.

Further, the base station device 100 (e.g., setting section 110) sets a selection reference (corresponding to a second selection reference) in the terminal device 200 for the terminal device 200 to select the format of the uplink message of the two-step RACH procedure. The base station device 100 sets the second selection reference to the terminal device 200 that supports the two-step RACH procedure. The terminal device 200 selects the format of the uplink message of the two-step RACH procedure on the basis of the second selection reference set by the base station device 100.

In a cell where an importance of timing advance adjustment is low, an importance of transmitting PRACH is low. Therefore, the terminal device 200 selects a format using PRACH in a cell having a high importance of timing advance adjustment, and selects a format not using PRACH in a cell having a low importance of timing advance adjustment. In a case where PRACH is not transmitted, power consumed by the terminal device 200 can be expected to be reduced. Further, in a case where PRACH is not transmitted, it is not necessary to set a resource of PRACH, which improves the resource efficiencies.

Hereinafter, an example of the selection reference will be described.

(1) Designation from Base Station Device 100

The base station device 100 may designate the format of the uplink message of the two-step RACH procedure to the terminal device 200. The base station device 100 determines the importance of timing advance adjustment and designates the format according to the determination result at the stage of cell designing. The terminal device 200 selects the format designated by the base station device 100.

The base station device 100 may, for example, cause the designation of the format to be included in the RACH setting and transmit the RACH setting to the terminal device 200. The format designation may be one-bit data indicating whether or not PRACH is transmitted. The RACH setting is included at least in the system information (MIB or SIB).

SPECIFIC EXAMPLES

The terminal device 200 transmits Message 1 of the two-step RACH procedure using PRACH and PUSCH in a case where the terminal device 200 is instructed by the base station device 100 to use PRACH and PUSCH. In contrast, in a case where the terminal device 200 is not instructed by the base station device 100 to use PRACH and PUSCH, the terminal device 200 transmits Message 1 of the two-step RACH procedure using only PUSCH.

(2) Path Loss

The terminal device 200 may select the format of the uplink message of the two-step RACH procedure on the basis of path loss between the base station device 100 and the terminal device 200.

The path loss correlates to propagation delay. In a case where the path loss is large, the propagation delay between the base station device 100 and the terminal device 200 becomes large, and therefore, it is desirable to compensate for the synchronization of the uplink by using PRACH. Accordingly, the terminal device 200 selects a format using PRACH and PUSCH in a case where the path loss is larger than a predetermined threshold, and selects a format using only PUSCH in a case where the path loss is smaller than a predetermined threshold. In this way, by selecting a format using PRACH only in a case where it is desirable to compensate for uplink synchronization, power consumption is reduced and resource-efficiency is improved.

Specific Examples

The terminal device 200 transmits Message 1 of the two-step RACH procedure using PRACH and PUSCH in a case where the path loss is larger than a predetermined threshold. In contrast, in a case where the path loss is smaller than a predetermined threshold, the terminal device 200 transmits Message 1 of the two-step RACH procedure using only PUSCH.

(3) PUSCH Waveforms

The terminal device 200 may select the format of the uplink message of the two-step RACH procedure on the basis of the waveform of PUSCH.

DFT-s-OFDM (SC-FDMA) is beneficial from a viewpoint of reducing transmission power. Therefore, DFT-s-OFDM is used when a large amount of transmission power is desired. For example, when the path loss is large due to a situation in which the terminal device 200 is distant from the base station device 100, a large amount of transmission power is desired. As described above, when the path loss is large, since the propagation delay between the base station device 100 and the terminal device 200 is large, it is desirable to compensate for the uplink synchronization using PRACH.

Therefore, the terminal device 200 selects a format using PRACH and PUSCH when DFT-s-OFDM is used, and selects a format using only PUSCH when DFT-s-OFDM is not used. In this way, by selecting a format using PRACH only in a case where it is desirable to compensate for the uplink synchronization, power consumption is reduced and resource-efficiency is improved.

Specific Examples

The terminal device 200 transmits Message 1 of the two-step RACH procedure using PRACH and PUSCH if the terminal device 200 is instructed by the base station device 100 to use DFT-s-OFDM as the PUSCH waveform. In contrast, if the terminal device 200 is instructed by the base station device 100 to use OFDM as the PUSCH waveform, the terminal device 200 transmits Message 1 of the two-step RACH procedure using only PUSCH.

(4) Frequency Band

The terminal device 200 may select the format of the uplink message of the two-step RACH procedure on the basis of a frequency band in which the two-step RACH procedure is executed.

First Example

The terminal device 200 selects the format of the uplink message of the two-step RACH procedure on the basis of whether LBT (Listen Before-Talk) is required in a cell executing the two-step RACH procedure.

In a cell where LBT is not required, since the terminal device 200 does not perform LBT, Message 1 of the two-step RACH procedure may be transmitted from each of a plurality of terminal devices 200 at the same time (i.e., using at least a partially overlapping physical resources). Therefore, the contention frequency of Messages 1 of the two-step RACH procedure is higher in the cell in which LBT is not required. Therefore, the terminal device 200 selects a format using PRACH and PUSCH in the cell in which LBT is not required. Thus, the base station device 100 is able to detect each Message 1 on the basis of PRACH even when Messages 1 of two-step RACH procedure are transmitted from the plurality of terminal devices 200 at the same time. In contrast, in a cell in which LBT is required, since the terminal device 200 performs LBT, it is unlikely that Messages 1 of two-step RACH procedure are transmitted from a plurality of terminal devices 200 at the same time. Therefore, in the cell in which LBT is required, the contention frequency of Messages 1 of the two-step RACH procedure is low. Therefore, the terminal device 200 selects a format using only PUSCH in the cell in which LBT is not required.

Specific Examples of First Example

The terminal device 200 transmits Message 1 of the two-step RACH procedure using PRACH and PUSCH if the cell performing the RACH procedure is a licensed band (a frequency band in which LBT is not required). In contrast, if the cell performing the RACH procedure is an unlicensed band (a frequency band in which LBT is required), the terminal device 200 transmits Message 1 of the two-step RACH procedure using only PUSCH.

Second Example

The terminal device 200 selects the format of the uplink message of the two-step RACH procedure on the basis of whether the frequency band of the cell in which the two-step RACH procedure is executed is greater than or equal to a predetermined frequency band.

The frequency band of a cell correlates to a magnitude of a coverage of the cell. When the frequency band of the cell is high and the coverage is small, the propagation delay is small. Therefore, the effect of compensating for uplink synchronization using PRACH is low, so that PRACH does not necessarily be transmitted. In contrast, when the frequency band of the cell is low and the coverage is large, the propagation delay is large. It is therefore desirable to compensate for the uplink synchronization using PRACH.

Specific Examples of Second Example

The terminal device 200 transmits Message 1 of the two-step RACH procedure using PRACH and PUSCH if the frequency band of the cell executing the two-step RACH procedure is less than a predetermined frequency band. In contrast, if the frequency band of the cell executing the two-step RACH procedure is larger than or equal to a predetermined frequency band, the terminal device 200 transmits Message 1 of the two-step RACH procedure using only PUSCH.

(5) Number of Retransmissions of Message 1 of Two-Step RACH Procedure

The terminal device 200 selects the format of the uplink message of the two-step RACH procedure on the basis of the number of retransmissions of Message 1 of the two-step RACH procedure.

If the terminal device 200 executes the two-step RACH procedure, the terminal device 200 may retransmit Message 1 of the two-step RACH procedure until the two-step RACH procedure succeeds. One of the factors that increase the number of retransmissions is the contention of PUSCH, which is caused by a plurality of terminal devices 200 using the same physical resource. Accordingly, the terminal device 200 selects a format using only PUSCH when the number of times of retransmissions is less than a predetermined threshold, and selects a format using PRACH and PUSCH when the number of retransmissions is greater than or equal to a predetermined threshold. When the number of retransmissions increases, Message 1 of the two-step RACH procedure is transmitted using the PRACH. This enables to improve the possibility that the base station device 100 will successfully detect Message 1 on the basis of PRACH, even if the contention of PUSCH occurs.

It is to be noted that the thresholds of the number of retransmissions may be specified by base station device 100. For example, the base station device 100 may cause a threshold value of the number of retransmissions to be included in the RACH setting and transmit the RACH setting to the terminal device 200. The RACH setting may be included in the system information (MIB or SIB).

Specific Examples

For the first transmission, the terminal device 200 transmits Message 1 of the two-step RACH procedure using only PUSCH. In contrast, for retransmission, the terminal device 200 transmits Message 1 of the two-step RACH procedure using PRACH and PUSCH.

[Flow of Process]

Figure 15:
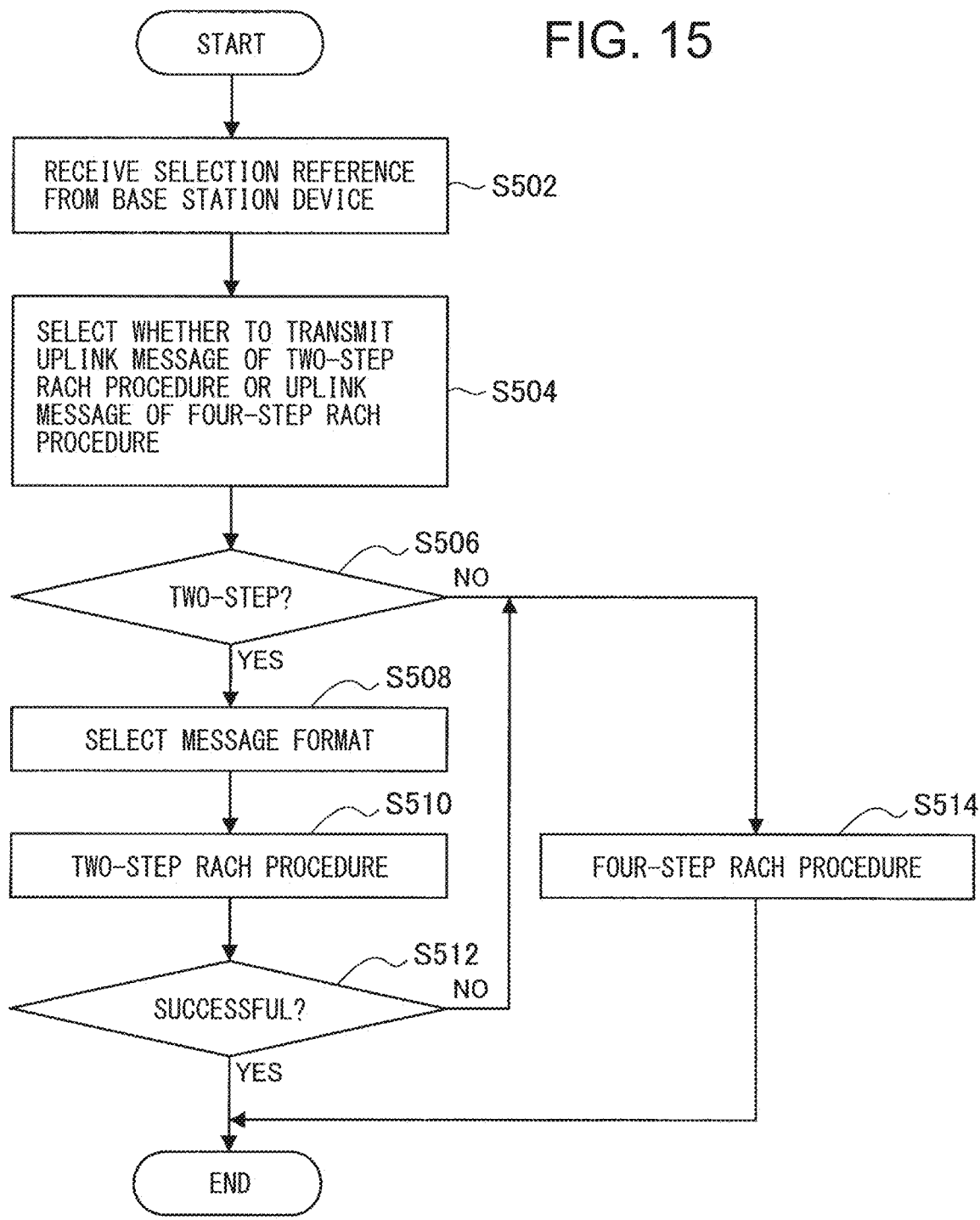
FIG. 15 is a flowchart illustrating an example of a flow of a switching process executed by the terminal device according to the embodiment.

Referring to FIG. 15, an example of a flow of the RACH procedure related to the switching of the RACH procedure and the switching of the format described above will be described.

FIG. 15 is a flowchart illustrating an example of a flow of the RACH procedure executed by the terminal device 200 according to the present embodiment. As illustrated in FIG. 15, first, the terminal device 200 receives a selection reference from the base station device 100 (step S502). The selection reference herein includes the first selection reference for RACH procedure selection, and the second selection reference for format selection. The terminal device 200 then selects which of the uplink message of the two-step RACH procedure or the uplink message of the four-step RACH procedure is to be transmitted (step S504). The terminal device 200 makes the selection on the basis of the first selection reference received in step S502.

If the uplink message of the two-step RACH procedure is selected (step S506/YES), the terminal device 200 selects the uplink message format of the two-step RACH procedure (step S508). The terminal device 200 makes the selection on the basis of the second selection reference received in step S502. The terminal device 200 then executes the two-step RACH procedure (step S510). In detail, the terminal device 200 transmits Message 1 of the two-step RACH procedure to the base station device 100. If the two-step RACH procedure is successful (step S512/YES), the process ends. In contrast, if the two-step RACH procedure is unsuccessful (step S512/NO), the terminal device 200 performs the fallback to the four-step RACH procedure (step S514). The process in step S514 will be described in detail below.

If the uplink message of the four-step RACH procedure is selected (step S506/NO), the terminal device 200 executes the four-step RACH procedure (step S514). In detail, the terminal device 200 transmits Message 1 of the four-step RACH procedure to the base station device 100. Thereafter, the terminal device 200 transmits and receives Messages 2 to 5 of the four-step RACH procedure to and from the base station device 100. If the four-step RACH procedure succeeds, the process ends.

4. APPLICATION EXAMPLES

The technology according to an embodiment of the present disclosure can be applied to various products. For example, the base station device 100 may be realized as any type of evolved Node B (eNB) such as a macro eNB or a small eNB. The small NB may be an eNB that covers a cell, such as a pico eNB, a micro eNB, or a home (femto) eNB, smaller than a macro cell. Instead, the base station device 100 may be realized as another type of base station such as a NodeB or a base transceiver station (BTS). The base station device 100 may include a main entity (also referred to as a base station device) that controls radio communication and one or more remote radio heads (RRHs) disposed at different locations from the main entity. Further, various types of terminals to be described below may operate as the base station device 100 by performing a base station function temporarily or permanently.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation apparatus. Further, the terminal device 200 may be realized as a terminal that performs machine to machine (M2M) communication (also referred to as a machine type communication (MTC) terminal). Moreover, the terminal device 200 may be a radio communication module mounted on the terminal (for example, an integrated circuit module configured on one die).

[Application Example Related to Base Station Device]

First Application Example

Figure 16:
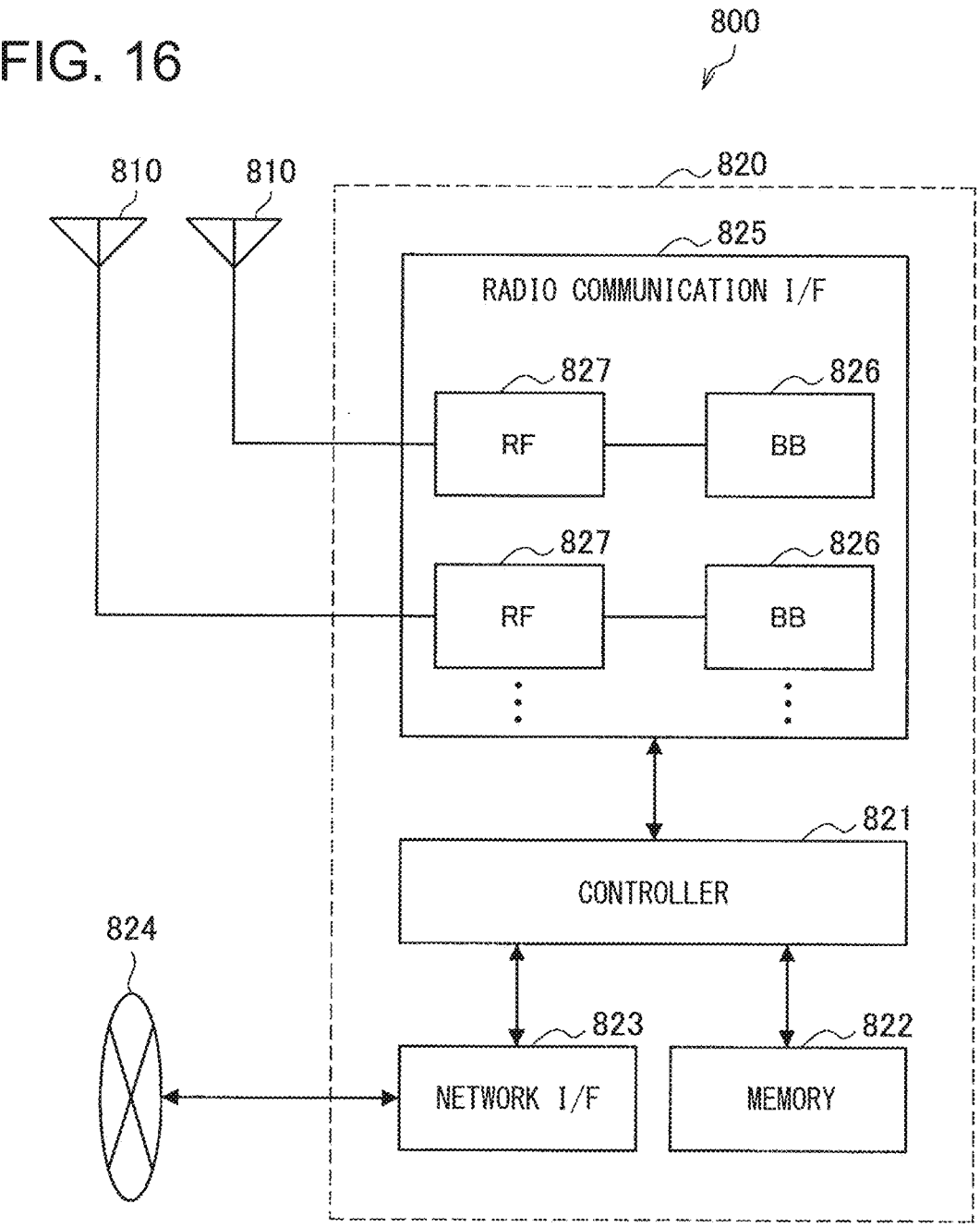
FIG. 16 is a block diagram illustrating a first example of a schematic configuration of eNB.

FIG. 16 is a block diagram illustrating a first example of a schematic configuration of an eNB to which the technology according to an embodiment of the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a radio signal. The eNB 800 may include the plurality of the antennas 810 as illustrated in FIG. 16, and the plurality of antennas 810 may, for example, correspond to a plurality of frequency bands used by the eNB 800. It should be noted that while FIG. 16 illustrates an example in which the eNB 800 includes the plurality of antennas 810, the eNB 800 may include the single antenna 810.

The base station device 820 includes a controller 821, a memory 822, a network interface 823, and a radio communication interface 825.

The controller 821 may be, for example, a CPU or a DSP, and operates various functions of an upper layer of the base station device 820. For example, the controller 821 generates a data packet from data in a signal processed by the radio communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a radio communication interface for radio backhaul. In the case where the network interface 823 is a radio communication interface, the network interface 823 may use a higher frequency band for radio communication than a frequency band used by the radio communication interface 825.

The radio communication interface 825 supports a cellular communication system such as long term evolution (LTE) or LTE-Advanced, and provides radio connection to a terminal located within the cell of the eNB 800 via the antenna 810. The radio communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a radio signal via the antenna 810.

The radio communication interface 825 may include a plurality of the BB processors 826 as illustrated in FIG. 16, and the plurality of BB processors 826 may, for example, correspond to a plurality of frequency bands used by the eNB 800. Further, the radio communication interface 825 may also include a plurality of the RF circuits 827, as illustrated in FIG. 16, and the plurality of RF circuits 827 may, for example, correspond to a plurality of antenna elements. Note that FIG. 16 illustrates an example in which the radio communication interface 825 includes the plurality of BB processors 826 and the plurality of RF circuits 827, but the radio communication interface 825 may include the single BB processor 826 or the single RF circuit 827.

In the eNB 800 illustrated in FIG. 16, the higher layer processor 101, the controller 103, the receiver 105, and/or the transmitter 107 described with reference to FIG. 5 may be implemented in the radio communication interface 825 (e.g., the BB processor 826 and/or the RF circuit 827), the controller 821, and/or the network interface 823. In other words, in the eNB 800 illustrated in FIG. 16, the setting section 110, the selector 120, and/or the message transmitter/receiver 130 described with reference to FIG. 12 may be implemented in the radio communication interface 825 (e.g., the BB processor 826 and/or the RF circuit 827), the controller 821, and/or the network interface 823. For example, the radio communication interface 825, the controller 821, and/or the network interface 823 may set the first selection reference and the second selection reference to the terminal device 200, and transmit and receive the message of the two-step RACH procedure or the four-step RACH procedure to and from the terminal device 200. For example, functions for performing these operations may be implemented in a processor included in the radio communication interface 825. As a device for performing such an operation, the eNB 800, the base station device 820, or the above-mentioned modules may be provided, and programs for causing a processor to perform the above-mentioned operation may be provided. In addition, a readable recording medium having the above-described program recorded thereon may be provided. The transmission-reception antenna 109 may also be implemented in the antenna 810.

Second Application Example

Figure 17:
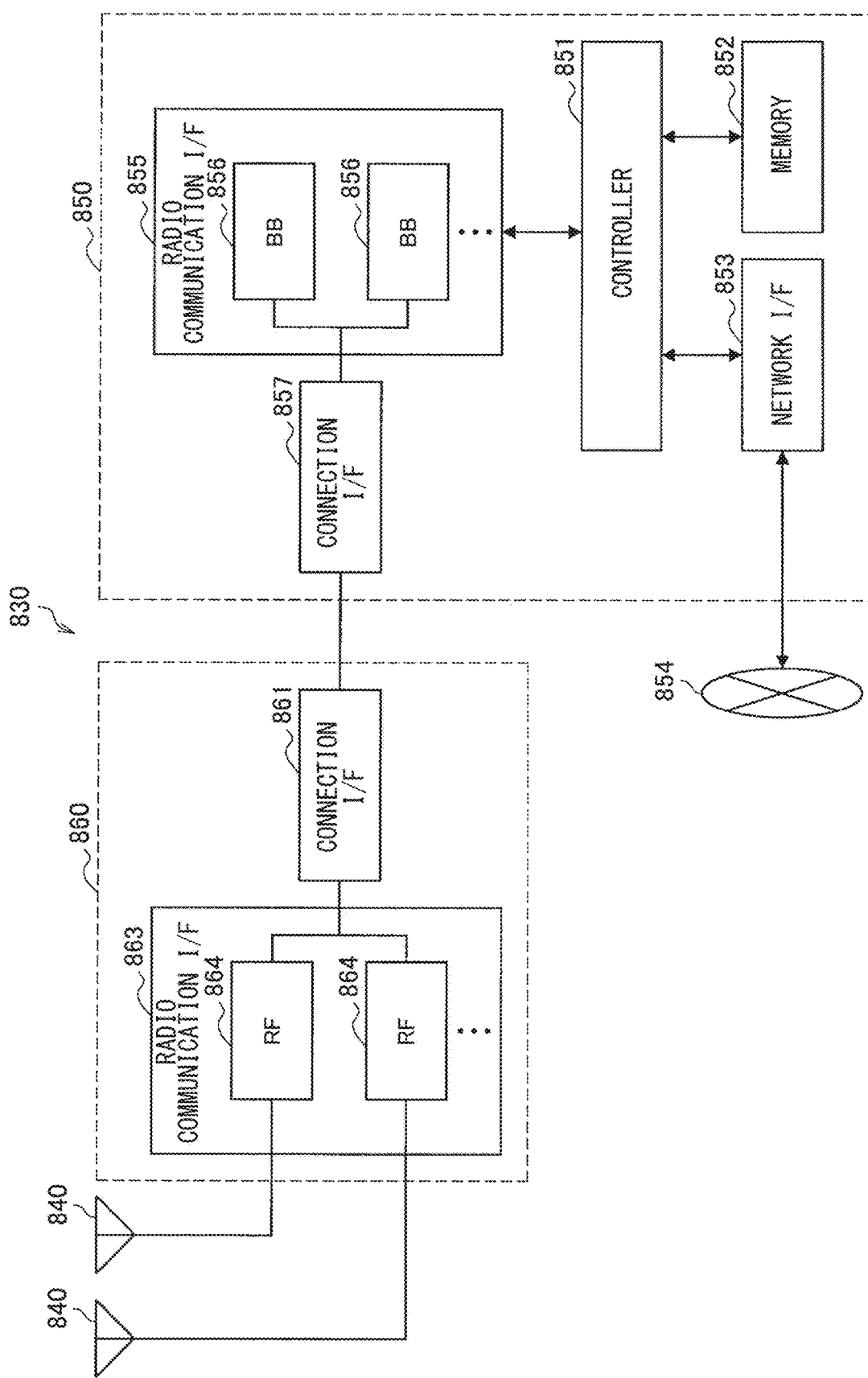
FIG. 17 is a block diagram illustrating a second example of a schematic configuration of eNB.

FIG. 17 is a block diagram illustrating a second example of a schematic configuration of an eNB to which the technology according to an embodiment of the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a radio signal. The eNB 830 may include a plurality of the antennas 840 as illustrated in FIG. 17, and the plurality of antennas 840 may, for example, correspond to a plurality of frequency bands used by the eNB 830. Note that FIG. 17 illustrates an example in which the eNB 830 includes the plurality of antennas 840, but the eNB 830 may include the single antenna 840.

The base station device 850 includes a controller 851, a memory 852, a network interface 853, a radio communication interface 855, and a connection interface 857. The controller 851, the memory 852, and the network interface 853 are similar to the controller 821, the memory 822, and the network interface 823 described with reference to FIG. 16.

The radio communication interface 855 supports a cellular communication system such as LTE and LTE-Advanced, and provides radio connection to a terminal located in a sector corresponding to the RRH 860 via the RRH 860 and the antenna 840. The radio communication interface 855 may typically include a BB processor 856 or the like. The BB processor 856 is similar to the BB processor 826 described with reference to FIG. 16 except that the BB processor 856 is connected to an RF circuit 864 of the RRH 860 via the connection interface 857. The radio communication interface 855 may include a plurality of the BB processors 856, as illustrated in FIG. 17, and the plurality of BB processors 856 may, for example, correspond to a plurality of frequency bands used by the eNB 830. Note that FIG. 17 illustrates an example in which the radio communication interface 855 includes the plurality of BB processors 856, but the radio communication interface 855 may include the single BB processor 856.

The connection interface 857 is an interface for connecting the base station device 850 (radio communication interface 855) to the RRH 860. The connection interface 857 may be a communication module for communication on the high speed line which connects the base station device 850 (radio communication interface 855) to the RRH 860.

Further, the RRH 860 includes a connection interface 861 and a radio communication interface 863.

The connection interface 861 is an interface for connecting the RRH 860 (radio communication interface 863) to the base station device 850. The connection interface 861 may be a communication module for communication on the high speed line.

The radio communication interface 863 transmits and receives a radio signal via the antenna 840. The radio communication interface 863 may typically include the RF circuit 864 or the like. The RF circuit 864 may include a mixer, a filter, an amplifier and the like, and transmits and receives a radio signal via the antenna 840. The radio communication interface 863 may include a plurality of the RF circuits 864 as illustrated in FIG. 17, and the plurality of RF circuits 864 may, for example, correspond to a plurality of antenna elements. Note that FIG. 17 illustrates an example in which the radio communication interface 863 includes the plurality of RF circuits 864, but the radio communication interface 863 may include the single RF circuit 864.

In the eNB 830 illustrated in FIG. 17, the higher layer processor 101, the controller 103, the receiver 105, and/or the transmitter 107 described with reference to FIG. 5 may be implemented in the radio communication interface 855, the radio communication interface 863 (e.g., the BB processor 856 and/or the RF circuit 864), the controller 851, and/or the network interface 853. In other words, in the eNB 830 illustrated in FIG. 17, the setting section 110, the selector 120, and/or the message transmitter/receiver 130 described with reference to FIG. 12 may be implemented in the radio communication interface 855, the radio communication interface 863 (e.g., the BB processor 856 and/or the RF circuit 864), the controller 851, and/or the network interface 853. For example, the radio communication interface 855, the radio communication interface 863, the controller 851, and/or the network interface 853 may set the first selection reference and the second selection reference to the terminal device 200, and transmit and receive the message of the two-step RACH procedure or the four-step RACH procedure to and from the terminal device 200. For example, functions for performing these operations may be implemented in a processor included in the radio communication interface 855 and/or the radio communication interface 863. As a device for performing such an operation, the eNB 830, the base station device 850, or the above-mentioned modules may be provided, and programs for causing a processor to perform the above-mentioned operation may be provided. In addition, a readable recording medium having the above-described program recorded thereon may be provided. The transmission-reception antenna 109 may also be implemented in the antenna 840.

[Application Example Related to Terminal Device]

First Application Example

Figure 18:
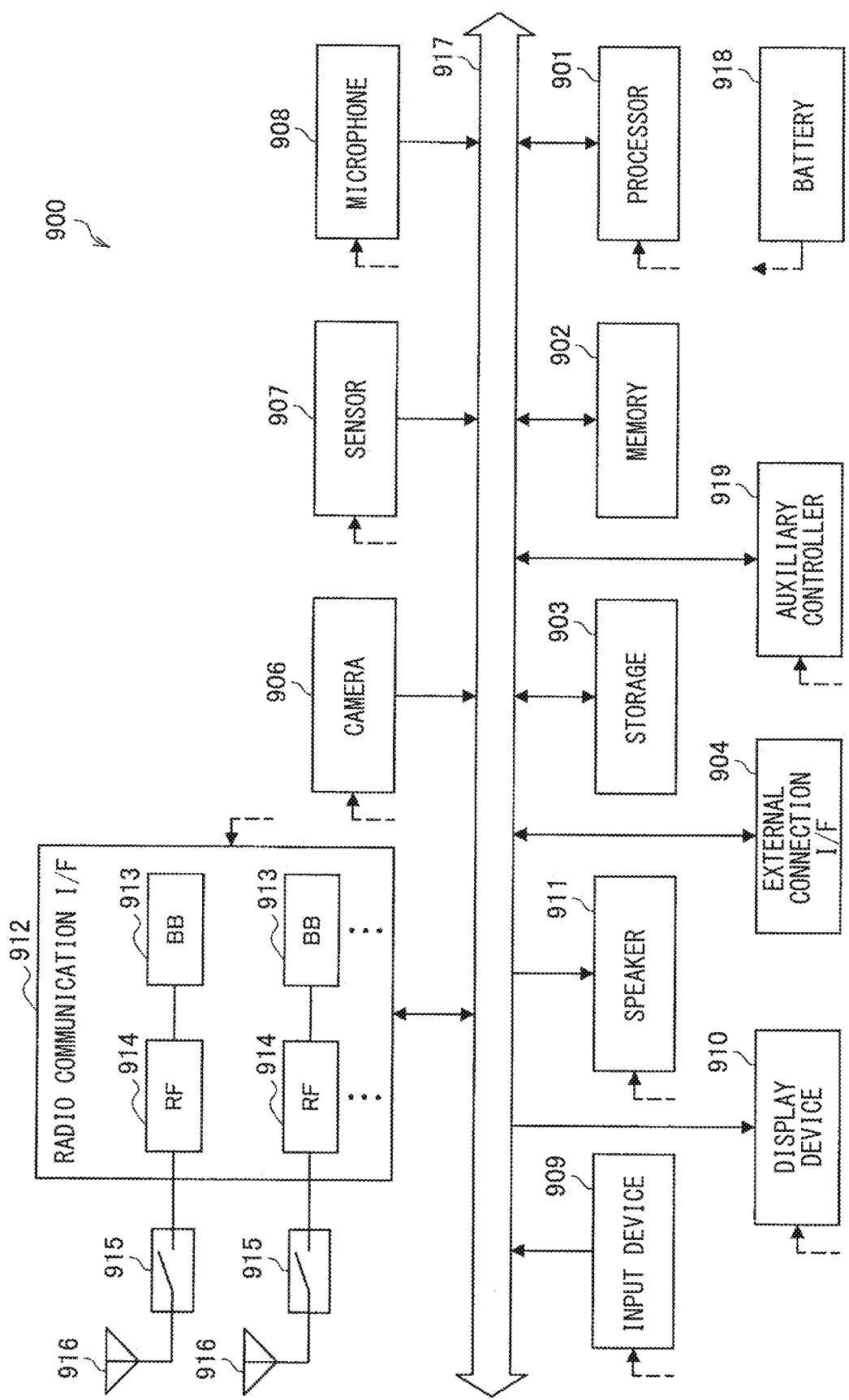
FIG. 18 is a block diagram illustrating an example of a schematic configuration of a smartphone.

FIG. 18 is a block diagram illustrating an example of a schematic configuration of a smartphone 900 to which the technology according to an embodiment of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The radio communication interface 912 supports a cellular communication system such as LTE or LTE-Advanced, and performs radio communication. The radio communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for radio communication. On the other hand, the RF circuit 914 may include a mixer, a filter, an amplifier, and the like, and transmits and receives a radio signal via the antenna 916. The radio communication interface 912 may be a one-chip module in which the BB processor 913 and the RF circuit 914 are integrated. The radio communication interface 912 may include a plurality of BB processors 913 and a plurality of RF circuits 914 as illustrated in FIG. 18. Note that FIG. 18 illustrates an example in which the radio communication interface 912 includes a plurality of BB processors 913 and a plurality of RF circuits 914, but the radio communication interface 912 may include a single BB processor 913 or a single RF circuit 914.

Further, the radio communication interface 912 may support other types of radio communication system such as a short range radio communication system, a near field communication system, and a wireless local area network (LAN) system in addition to the cellular communication system, and in this case, the radio communication interface 912 may include the BB processor 913 and the RF circuit 914 for each radio communication system.

Each antenna switch 915 switches a connection destination of the antenna 916 among a plurality of circuits (for example, circuits for different radio communication systems) included in the radio communication interface 912.

Each of the antennas 916 includes one or more antenna elements (for example, a plurality of antenna elements constituting a MIMO antenna) and is used for transmission and reception of the radio signal by the radio communication interface 912. The smartphone 900 may include a plurality of antennas 916 as illustrated in FIG. 18. Note that FIG. 18 illustrates an example in which the smartphone 900 includes a plurality of antennas 916, but the smartphone 900 may include a single antenna 916.

Further, the smartphone 900 may include the antenna 916 for each radio communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies electric power to each block of the smartphone 900 illustrated in FIG. 18 via a feeder line that is partially illustrated in the figure as a dashed line. The auxiliary controller 919, for example, operates a minimally necessary function of the smartphone 900 in a sleep mode.

In the smartphone 900 illustrated in FIG. 18, the higher layer processor 201, the controller 203, the receiver 205, and/or the transmitter 207 described with reference to FIG. 6 may be implemented in the radio communication interface 912 (e.g., the RF circuit 914 and/or the BB processor 913), the processor 901, and/or the auxiliary controller 919. In other words, in the smartphone 900 illustrated in FIG. 18, the selector 210 and/or the message transmitter/receiver 220 described with reference to FIG. 13 may be implemented in the radio communication interface 912 (e.g., the RF circuit 914 and/or the BB processor 913), the processor 901, and/or the auxiliary controller 919. For example, the radio communication interface 912, the processor 901, and/or the auxiliary controller 919 may select whether to perform the two-RACH procedure or the four-RACH procedure, and the message format, and transmit and receive the message of the RACH procedure to and from the base station device 100 on the basis of the selection result. For example, functions for performing those operations may be implemented in a processor included in the radio communication interface 912. The smartphone 900 or the above-mentioned modules may be provided as a device for performing such an operation, or programs for causing a processor to perform the above-mentioned operation may be provided. In addition, a readable recording medium having the above-described program recorded thereon may be provided. The transmission-reception antenna 209 may also be implemented in the antenna 916.

Second Application Example

Figure 19:
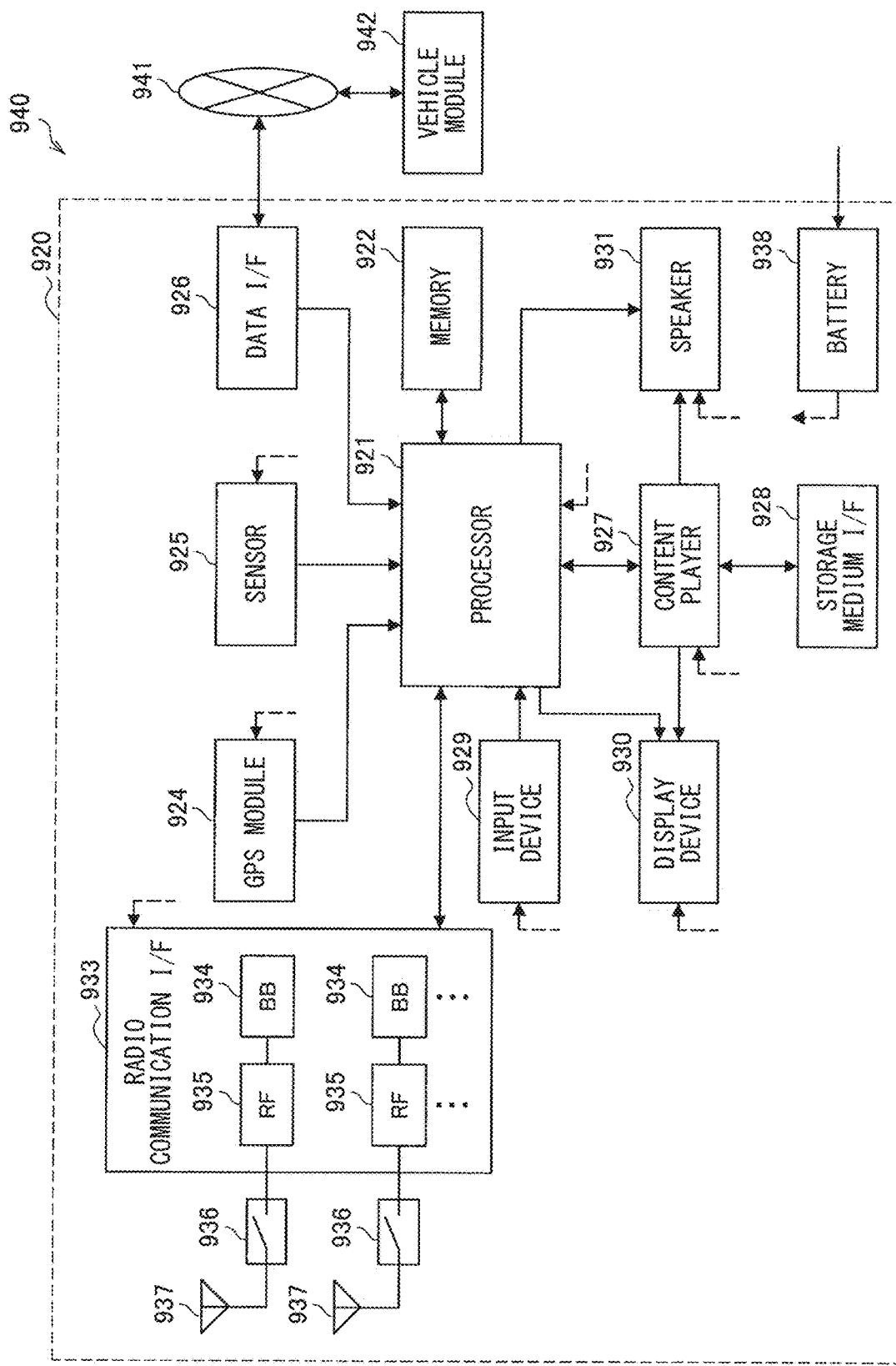
FIG. 19 is a block diagram illustrating an example of a schematic configuration of a car navigation apparatus.

FIG. 19 is a block diagram illustrating an example of a schematic configuration of a car navigation apparatus 920 to which the technology according to an embodiment of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The radio communication interface 933 supports a cellular communication system such as LTE or LTE-Advanced, and performs radio communication. The radio communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for radio communication. On the other hand, the RF circuit 935 may include a mixer, a filter, an amplifier, and the like, and transmits and receives a radio signal via the antenna 937. The radio communication interface 933 may be a one-chip module in which the BB processor 934 and the RF circuit 935 are integrated. The radio communication interface 933 may include a plurality of BB processors 934 and a plurality of RF circuits 935 as illustrated in FIG. 19. Note that FIG. 19 illustrates an example in which the radio communication interface 933 includes a plurality of BB processors 934 and a plurality of RF circuits 935, but the radio communication interface 933 may include a single BB processor 934 or a single RF circuit 935.

Further, the radio communication interface 933 may support other types of radio communication system such as a short range radio communication system, a near field communication system, and a wireless LAN system in addition to the cellular communication system, and in this case, the radio communication interface 933 may include the BB processor 934 and the RF circuit 935 for each radio communication system.

Each antenna switch 936 switches a connection destination of the antenna 937 among a plurality of circuits (for example, circuits for different radio communication systems) included in the radio communication interface 933.

Each of the antennas 937 includes one or more antenna elements (for example, a plurality of antenna elements constituting a MIMO antenna) and is used for transmission and reception of the radio signal by the radio communication interface 933. The car navigation apparatus 920 may include a plurality of antennas 937 as illustrated in FIG. 19. Note that FIG. 19 illustrates an example in which the car navigation apparatus 920 includes a plurality of antennas 937, but the car navigation apparatus 920 may include a single antenna 937.

Further, the car navigation apparatus 920 may include the antenna 937 for each radio communication system. In this case, the antenna switch 936 may be omitted from a configuration of the car navigation apparatus 920.

The battery 938 supplies electric power to each block of the car navigation apparatus 920 illustrated in FIG. 19 via a feeder line that is partially illustrated in the figure as a dashed line. Further, the battery 938 accumulates the electric power supplied from the vehicle.

In the car navigation apparatus 920 illustrated in FIG. 19, the higher layer processor 201, the controller 203, the receiver 205, and/or the transmitter 207 described with reference to FIG. 6 may be implemented in the radio communication interface 933 (e.g., the RF circuit 935 and/or the BB processor 934), and/or the processor 921. In other words, in the car navigation apparatus 920 illustrated in FIG.

19, the selector 210 and/or the message transmitter/receiver 220 described with reference to FIG. 13 may be implemented in the radio communication interface 933 (e.g., the RF circuit 935 and/or the BB processor 934) and/or the processor 921. For example, the radio communication interface 933 and/or the processor 921 may select whether to perform the two-RACH procedure or the four-RACH procedure, and the message format, and transmit and receive the message of the RACH procedure to and from the base station device 100 on the basis of the selection result. For example, function for performing those operations may be implemented in a processor included in the radio communication interface 933. As a device for performing such an operation, the car navigation apparatus 920 or the above-mentioned modules may be provided, and programs for causing a processor to perform the above-mentioned operation may be provided. In addition, a readable recording medium having the above-described program recorded thereon may be provided. The transmission-reception antenna 209 may also be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

5. CONCLUSION

Heretofore, an embodiment of the present disclosure has been described above in detail with reference to FIGS. 1 to 19. As described above, the terminal device 200 according to the present embodiment selects, in the RACH procedure, which of the first uplink message, which is the two-step RACH procedure uplink message, and the second uplink message, which is the four-step RACH procedure uplink message, is to be transmitted to the base station device 100. That is, the terminal device 200 selects whether to execute the two-step RACH procedure or the four-step RACH procedure. The two-step RACH procedure has a smaller latency as compared with the four-step RACH procedure, but lacks a stability due to the effect that the contention resolution is not enough, or the like. In contrast, the four-step RACH procedure has enough stability, but has a high latency. The terminal device 200 is able to reduce the latency of the RACH procedure and maintain the stability of the RACH procedure by using the two-step RACH procedure and the four-step RACH procedure while flexibly switching between the two-step RACH procedure and the four-step RACH procedure according to a predetermined selection reference.

In addition, the base station device 100 according to the present embodiment sets the first selection reference for the terminal device 200 to select which of the first uplink message, which is the two-step RACH procedure uplink message, and the second uplink message, which is the four-step RACH procedure uplink message, is to be transmitted in the RACH procedure to the terminal device 200. The base station device 100 is able to be used in combination with the terminal device 200 while appropriately switching between the two-step RACH procedure and the four-step RACH procedure.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

The processes described with reference to flowcharts and sequence diagrams in this specification do not necessarily be executed in the order illustrated. Several processing steps may be performed in parallel. Further, additional processing steps may be adopted, and some processing steps may be omitted.

Furthermore, the effects described herein are merely illustrative and exemplary, and not limiting. That is, the technique according to an embodiment of the present disclosure can exert other effects that are apparent to those skilled in the art from the description herein, in addition to the above-mentioned effects or in place of the above-mentioned effects.

It is to be noted that the present disclosure may have the following configurations.

(1)

A terminal device including
a selector that selects, in a RACH procedure, whether to transmit a first uplink message or a second uplink message to a base station device, the first uplink message being an uplink message of a two-step RACH procedure, the second uplink message being an uplink message of a four-step RACH procedure.

(2)

The terminal device according to (1), wherein the selector selects whether to transmit the first uplink message or the second uplink message to the base station device, on a basis of an RRC state of the terminal device.

(3)

The terminal device according to (2), wherein the selector selects the second uplink message in a case where the RRC state of the terminal device is an idle mode, and selects the first uplink message in a case were the RRC state of the terminal device is an inactive mode or a connected mode.

(4)

The terminal device according to any one of (1) to (3), wherein the selector first selects the first uplink message, and, in a case where the two-step RACH procedure is unsuccessful, selects the second up message.

(5)

The terminal device according to (4), wherein the selector selects the second up message in a case where the two-step RACH procedure is unsuccessful even if a number of transmissions of the first uplink message exceeds a predetermined threshold.

(6)

The terminal device according to (4) or (5), wherein the selector recognizes, as an unsuccess of the two-step RACH procedure, no reception of a first downlink message of the two-step RACH procedure corresponding to the first uplink message from the base station device.

(7)

The terminal device according to any one of (4) to (6), wherein the selector recognizes, as an unsuccess of the two-step RACH procedure, reception of information designating switching to the four-step RACH procedure from the base station device.

(8)

The terminal device according to any one of (1) to (7), wherein the selector selects whether to transmit the first uplink message or the second uplink message to the base station device, on a basis of a cell in which the RACH procedure is performed.

(9)

The terminal device according to any one of (1) to (8), wherein the selector selects whether to transmit the first uplink message or the second uplink message to the base station device, on a basis of a use to which the RACH procedure is applied.

(10)

The terminal device according to any one of (1) to (9), wherein the selector selects a format of the first uplink message.

(11)

The terminal device according to any one of (1) to (10), wherein information included in the first uplink message is different from information included in the second uplink message.

(12)

The terminal device according to any one of (1) to (11), wherein a format of the first uplink message is different from a format of the second uplink message.

(13)

A base station device including
a setting section that sets, in a terminal device, a first selection reference for the terminal device to select whether to transmit a first uplink message or a second uplink message in a RACH procedure, the first uplink message being an uplink message of a two-step RACH procedure, the second uplink message being an uplink message of a four-step RACH procedure.

(14)

The base station device according to (13), wherein the setting section sets, in the terminal device, a second selection reference for the terminal device to select a format of the first uplink message.

(15)

A method executed by a processor, the method including selecting, in a RACH procedure, whether to transmit a first uplink message or a second uplink message to a base station device, the first uplink message being an uplink message of a two-step RACH procedure, the second uplink message being an uplink message of a four-step RACH procedure.

(16)

A method executed by a processor, the method including setting, in a terminal device, a first selection reference for the terminal device to select whether to transmit a first uplink message or a second uplink message in a RACH procedure, the first uplink message being an uplink message of a two-step RACH procedure, the second uplink message being an uplink message of a four-step RACH procedure.

(17)

A recording medium having a program recorded thereon, the program causing a computer to function as a selector that selects, in a RACH procedure, whether to transmit a first uplink message or a second uplink message to a base station device, the first uplink message being an uplink message of a two-step RACH procedure, the second uplink message being an uplink message of a four-step RACH procedure.

(18)

A recording medium having a program recorded thereon, the program causing a computer to function as a setting section that sets, in a terminal device, a first selection reference for the terminal device to select whether to transmit a first uplink message or a second uplink message in a RACH procedure, the first uplink message being an uplink message of a two-step RACH procedure, the second uplink message being an uplink message of a four-step RACH procedure.

REFERENCE SIGNS LIST 100 base station device
101 higher layer processor
103 controller
105 receiver
1051 decoder
1053 demodulator
1055 demultiplexer
1057 radio receiver
1059 channel measurement section
107 transmitter
1071 encoder
1073 demodulator
1075 multiplexer
1077 radio transmitter
1079 downlink reference signal generator
109 transmission-reception antenna
110 setting section
120 selector
130 message transmitter/receiver
200 terminal device
201 higher layer processor
203 controller
205 receiver
2051 decoder
2053 demodulator
2055 demultiplexer
2057 radio receiver
2059 channel measurement section
207 transmitter
2071 encoder
2073 demodulator
2075 multiplexer
2077 radio transmitter
2079 uplink reference signal generator
209 transmission-reception antenna
210 selector
220 message transmitter/receiver

The invention claimed is:

1. A user equipment comprising:
circuitry configured to
select, in a random access procedure, one of a first uplink message or a second uplink message for transmission to a base station device, the first uplink message being an uplink message of a two-step random access procedure, the second uplink message being an uplink message of a four-step random access procedure;
transmit the selected one of the first uplink message or the selected second uplink message to a base station apparatus; and
receive a first random access response to the transmitted first uplink message or a second random access response to the transmitted second uplink message,
wherein the first random access response is configured to be scheduled by a first Physical Downlink Control Channel (PDCCH) having a first Cyclic Redundancy Check (CRC) that is scrambled by a first Radio Network Temporary Identifier (RNTI), wherein the second random access response is configured to be scheduled by a second PDCCH having a second CRC that is scrambled by a second RNTI,
wherein the first RNTI is used in the two-step random access procedure and the second RNTI is a Random Access RNTI (RA-RNTI) used in the four-step random access procedure, and
wherein the first RNTI used in the two-step random access procedure includes a predetermined offset value relative to the second RNTI used in the four-step random access procedure.

2. The user equipment according to claim 1, wherein the first uplink message contains a first random access preamble message and a Physical Uplink Shared Channel (PUSCH) message, and
wherein the second uplink message only contains a second random access preamble message.

3. The user equipment according to claim 2, wherein the first RNTI is determined based on a time and frequency resource of the first random access preamble message, and the second RNTI is determined based on a time and frequency resource of the second random access preamble message.

4. A base station apparatus comprising:
circuitry configured to
receive one of a first uplink message or a second uplink message from a user equipment,
wherein the first uplink message is an uplink message of a two-step random access procedure, and
wherein the second uplink message is an uplink message of a four-step random access procedure; and
transmit a first random access response to the received first uplink message or a second random access response to the received second uplink message,
wherein the first random access response is configured to be scheduled by a first Physical Downlink Control Channel (PDCCH) having a first Cyclic Redundancy Check (CRC) that is scrambled by a first Radio Network Temporary Identified (RNTI),
wherein the second random access response is scheduled by a second PDCCH having a second CRC that is scrambled by a second RNTI,
wherein the first RNTI is used in the two-step random access procedure and the second RNTI is a Random Access RNTI (RA-RNTI) used in the four-step random access procedure, and
wherein the first RNTI used in the two-step random access procedure includes is calculated to include a predetermined offset value relative to the second RNTI for the second RA RNTI used in the four-step random access procedure.

5. The base station apparatus according to claim 4, wherein the first uplink message contains a first random access preamble message and a Physical Uplink Shared Channel (PUSCH) message, and
wherein the second uplink message only contains a second random access preamble message.

6. The base station apparatus according to claim 5, wherein the first RNTI is determined based on a time and frequency resource of the first random access preamble message, and the second RNTI is determined based on a time and frequency resource of the second random access preamble message.

7. A method for a user equipment, the method comprising:
selecting, in a random access procedure, one of a first uplink message or a second uplink message for transmission to a base station device, the first uplink message being an uplink message of a two-step random access procedure, the second uplink message being an uplink message of a four-step random access procedure;
transmitting the selected one of the first uplink message or the selected second uplink message to a base station apparatus; and
receiving a first random access response to the transmitted first uplink message or a second random access response to the transmitted second uplink message,
wherein the first random access response is configured to be scheduled by a first Physical Downlink Control Channel (PDCCH) having a first Cyclic Redundancy Check (CRC) that is scrambled by a first Radio Network Temporary Identifier (RNTI),
wherein the second random access response is configured to be scheduled by a second PDCCH having a second CRC that is scrambled by a second RNTI,
wherein the first RNTI used in the two-step random access procedure and the second RNTI is a Random Access RNTI (RA-RNTI) used in the four-step random access procedure, and
wherein the first RNTI used in the two-step random access procedure includes a predetermined offset value relative to the second RNTI used in the four-step random access procedure.

8. The method according to claim 7, wherein the first uplink message contains a first random access preamble message and a Physical Uplink Shared Channel (PUSCH) message, and
wherein the second uplink message only contains a second random access preamble message.

9. The method according to claim 8, wherein the first RNTI is determined based on a time and frequency resource of the first random access preamble message, and the second RNTI is determined based on a time and a frequency resource of the second random access preamble message.

10. A method for a base station apparatus, the method comprising:
receiving one of a first uplink message or a second uplink message from a user equipment,
wherein the first uplink message is an uplink message of a two-step random access procedure, and
wherein the second uplink message is an uplink message of a four-step random access procedure; and
transmitting a first random access response to the received first uplink message or a second random access response to the received second uplink message,
wherein the first random access response is configured to be scheduled by a first Physical Downlink Control Channel (PDCCH) having a first Cyclic Redundancy Check (CRC) that is scrambled by a first Radio Network Temporary Identifier (RNTI),
wherein the second random access response is scheduled by a second PDCCH having a second CRC that is scrambled by a second RNTI,
wherein the first RNTI is used in the two-step random access procedure and the second RNTI is a Random Access RNTI (RA-RNTI) used in the four-step random access procedure, and
wherein the first RNTI used in the two-step random access procedure includes a predetermined offset value relative to the second RNTI used in the four-step random access procedure.

11. The method according to claim 10, wherein the first uplink message contains a first random access preamble message and a Physical Uplink Shared Channel (PUSCH) message, and
wherein the second uplink message only contains a second random access preamble message.

12. The method according to claim 11, wherein the first RNTI is determined based on a time and frequency resource of the first random access preamble message, and the second RNTI is determined based on a time and frequency resource of the second random access preamble message.

\* \* \* \* \*